(12) United States Patent
Hajiaghayi et al.

(10) Patent No.: US 8,670,351 B2
(45) Date of Patent: Mar. 11, 2014

(54) METHODS AND APPARATUS TO IMPLEMENT SCALABLE ROUTING IN NETWORK COMMUNICATION SYSTEMS

(75) Inventors: Mohammad Hajiaghayi, Florham Park, NJ (US); Mohammad Hossein Bateni, Princeton, NJ (US); Alexandre Gerber, Madison, NJ (US); Subhabrata Sen, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/531,018

(22) Filed: Jun. 22, 2012

(65) Prior Publication Data
US 2012/0275344 A1 Nov. 1, 2012

Related U.S. Application Data

(63) Continuation of application No. 12/563,815, filed on Sep. 21, 2009, now Pat. No. 8,218,454.

(51) Int. Cl.
*H04L 12/46* (2006.01)

(52) U.S. Cl.
USPC ........... 370/255; 370/254; 370/389; 370/401; 370/429; 709/240; 709/243; 709/249

(58) Field of Classification Search
USPC ......... 370/218, 238, 389, 395, 254, 429, 401; 709/240–243, 249
See application file for complete search history.

(56) References Cited

U.S. PATENT DOCUMENTS

| | | | |
|---|---|---|---|
| 6,772,226 B1 | 8/2004 | Bommareddy et al. | |
| 6,789,121 B2 | 9/2004 | Lamberton et al. | |
| 7,200,114 B1 | 4/2007 | Tse-Au | |
| 7,376,084 B2 | 5/2008 | Raghunath et al. | |
| 7,489,635 B2 | 2/2009 | Evans et al. | |
| 7,564,802 B2 | 7/2009 | Andrapalliyal et al. | |
| 7,796,607 B2 | 9/2010 | Gerber et al. | |
| 7,864,765 B2 * | 1/2011 | Borkenhagen et al. | ....... 370/389 |

(Continued)

OTHER PUBLICATIONS

S. Raghunath, K. K. Ramakrishnan, S. Kalyanaraman, C. Chase, "Measurement Based Characterization and Provisioning of IP VPNs," In Proc. Internet Measurement Conference, Oct. 2004, 14 pages.

(Continued)

*Primary Examiner* — Charles C Jiang
*Assistant Examiner* — Mohamed Kamara
(74) *Attorney, Agent, or Firm* — Hanley, Flight and Zimmerman, LLC

(57) ABSTRACT

An example method involves for a first virtual private network (VPN) installed on a candidate hub router, selecting a first spoke-to-hub assignment solution having a first least memory utilization cost to assign the candidate hub router a quantity of first virtual private edge (VPE) routers serving the first VPN; for a second VPN installed on the candidate hub router, selecting a second spoke-to-hub assignment solution having a second least memory utilization cost to assign the candidate hub router a quantity of second VPE routers serving the second VPN; determining third least memory utilization costs to assign the candidate hub router to a quantity of the first VPE routers, and fourth least memory utilization costs to assign the candidate hub router to a quantity of the second VPE routers; and selecting the first or second spoke-to-hub assignment solution for the candidate hub router based on the least memory utilization costs.

18 Claims, 13 Drawing Sheets

800 — CostWithCap(VPN)

```
Algorithm 2 CostWithCap(vpn)
{For simplicity, we assume the VPEs in this VPN are
numbered from 1 to n}
Initialize T'[vpn,count,bwidth] to ∞ for all values
T'[vpn,0,0] ← 0 and A'[vpn,0,0] ← ∅
for cnt = 1 to n do {n is # of elements in this vpn}
    for bw = 0 to b_i step r do
        for i = 1 to n do
            if v_i ≤ bw and
                T'[vpn,cnt,bw] > T'[vpn,cnt-1,bw-v_i]+c_i then
                T'[vpn,cnt,bw] ← T'[vpn,cnt-1,bw-v_i]+c_i
                A'[vpn,cnt,bw] ← A'[vpn,cnt-1,bw-v_i]∪{i}
            end if
        end for
    end for
end for
```

(56) References Cited

U.S. PATENT DOCUMENTS

| | | | |
|---|---|---|---|
| 2002/0101826 A1 | 8/2002 | Giacopelli et al. | |
| 2003/0096610 A1 | 5/2003 | Courtney et al. | |
| 2004/0202171 A1* | 10/2004 | Hama | 370/395.1 |
| 2005/0105475 A1* | 5/2005 | Norrgard et al. | 370/254 |
| 2006/0239199 A1 | 10/2006 | Blair et al. | |
| 2007/0008949 A1* | 1/2007 | Balandin | 370/351 |
| 2008/0298250 A1 | 12/2008 | Larsson | |
| 2009/0161658 A1 | 6/2009 | Danner et al. | |
| 2009/0175171 A1* | 7/2009 | Nikolova et al. | 370/238 |
| 2009/0180600 A1 | 7/2009 | Blackwell et al. | |
| 2009/0296714 A1 | 12/2009 | Gerber et al. | |
| 2010/0316022 A1 | 12/2010 | Kakadia et al. | |
| 2011/0069634 A1 | 3/2011 | Hajiaghayi et al. | |
| 2011/0188409 A1* | 8/2011 | Chen et al. | 370/254 |

OTHER PUBLICATIONS

S. Raghunath, S. Kalyanaraman, K. K. Ramakrishnan, "Trade-offs in Resource Management for Virtual Private Networks," In Proc. IEEE INFOCOM, Mar. 2005, 11 pages.

Bryan Ford, "Unmanaged Internet Protocol Taming the Edge Network Management Crisis," In ACM Computer Communication Review, vol. 34, pp. 93-98, 2004, 6 pages.

X. Zhang, P. Francis, J. Wang, K. Yoshida, "Scaling IP Routing with the Core Router-Integrated Overlay," In Proc. International Conference on Network Protocols, 2006, 10 pages.

Cisco 1200 Series Internet Router Architecture: Memory Details, downloaded from http://www.cisco.com/en/US/products/hw/routers/ps167/products_tech_note09186a00801e1dbe.shtml, Jul. 7, 2005, 6 pages.

U.S. IP VPN Services 2007-2011 Forecast, downloaded from http://www.idc.com/getdoc.jsp?containerId=210128, Dec. 2007, 1 page.

U.S. IP VPN Services 2006-2010 Forecast, downloaded from http://www.marketresearch.com/product/display.asp? productid=1330169&g=1, May 24, 2006, 1 page.

M. Bateni and M. Hajiaghayi, "The Assignment Problem in Content Distribution Networks: Unsplittable Hard-Capacitated Facility Location," In Proc. of ACM-SIAM SODA, 2009, pp. 1-16.

M. Caesar, T. Condie, J. Kannan, K. Lakshminarayanan, and I. Stoica, "ROFL: Routing on Flat Labels," In Proc. ACM SIGCOMM, Sep. 2006, pp. 363-374.

D. Farinacci, V. Fuller, D. Oran, and D. Meyer, "Locator/ID Separation Protocol (LISP). Internet-Draft" (work in progress), Nov. 2007, pp. 1-46.

U. Feige, "A Threshold of In n for Approximating Set Cover," J. ACM, 45 (1998), pp. 634-652.

A. Meyerson, K. Munagala, and S. Plotkin, "Cost-Distance: Two Metric Network Design, in IEEE FOCS," 2000, 14 pages.

C. Kim, A. Gerber, C. Lund, D. Pei, and S. Sen, "Scalable VPN Routing via Relaying," in ACM SIGMETRICS, 2008, 12 pages.

S. Raghunath, S. Kalyanaraman, and K. K. Ramakrishnan, "Trade-offs in Resource Management for Virtual Private Networks," in Proc. IEEE INFOCOM, Mar. 2005, 11 pages.

S. Raghunath, K. K. Ramakrishnan, S. Kalyanaraman, and C. Chase, "Measurement Based Characterization and Provisioning of IP VPNs," in Proc. Internet Measurement Conference, Oct. 2004, 14 pages.

C. Wilson, "Cogent throws down pricing gauntlet," TelephonyOnline, http://telephonyonline.com/ethernet/news/Cogent_price_cuts_06112008/, Jun. 11, 2008, 2 pages.

X. Zhang, P. Francis, J. Wang, and K. Yoshida, "Scaling IP Routing with the Core Router-Integrated Overlay," in Proc. International Conference on Network Protocols, 2006, 10 pages.

M. Bateni, A. Gerber, M. Hajiaghayi, and S. Sen, "Multi-VPN Optimization for Scalable Routing via Relaying," in IEEE/ACM Transactions on Networking, Oct. 2010, pp. 1-11.

Sample prices of cisco 12416 components. Google Shopping, http://www.google.com/products?q=cisco+12416&btnG=Search+Products&hl=en&show=dd/, Apr. 28, 2010, 2 pages.

Sample prices of juniper m320 components. Google Shopping, http://www.google.com/products?q=juniper+m320&btnG=Search+Products&hl=en&show=dd/, Apr. 28, 2010, 2 pages.

D.S. Johnson, "Approximation Algorithms for Combinatorial Problems," Massachusetts Institute of Technology, Proceedings of the fifth annual ACM symposium on Theory of computing, 1973, pp. 38-49.

R. Raz and S Safra, "A Sub-Constant Error Probability Low-Degree Test, and a Sub-Constant Error-Probability PCP Characterization of NP," ACM STOC, 1997, pp. 475-484.

M. Bateni, A. Gerber, M. Hajiaghayi, and S. Sen, "Multi-VPN Optimization for Scalable Routing via Relaying," in Proc. IEEE INFOCOM, 2009, pp. 2756-2760.

United States Patent and Trademark Office, "Notice of Allowance," issued in connection with U.S. Appl. No. 12/563,815, on Mar. 14, 2012 (10 pages).

United States Patent and Trademark Office, "Non-Final Office Action," issued in connection with U.S. Appl. No. 12/563,815, on Aug. 18, 2011 (15 pages).

* cited by examiner

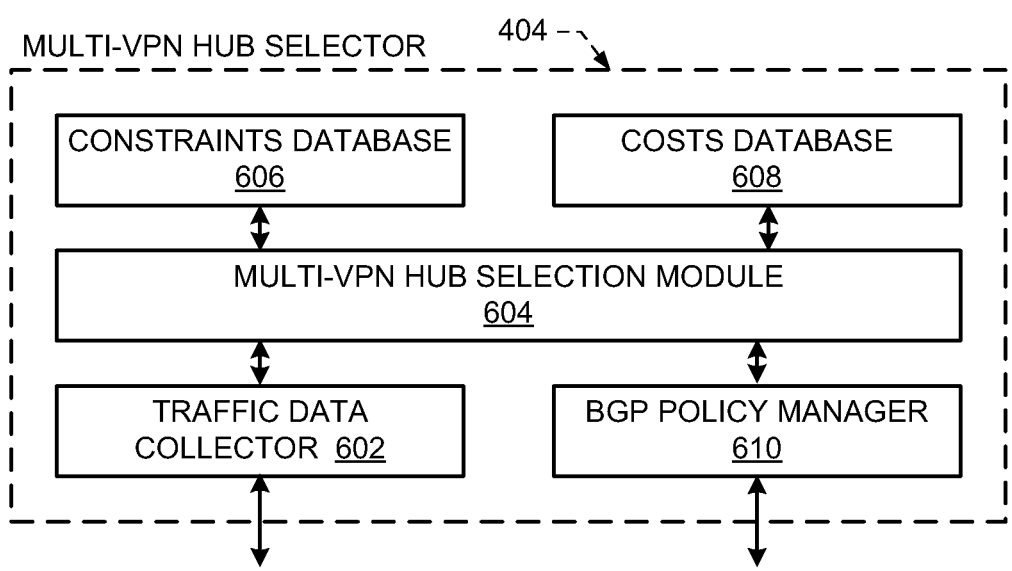

700 →

COMPUTEASSIGNMENT()

$f_i$: cost of building/maintaining PE $i$ as a hub
$b_i$: bandwidth limit on PE $i$
$m_i$: memory capacity on the routing table size of PE $i$
$s_i$: memory usage of VPN $i$ (routing table)
$d(i,j)$: latency on the path between PEs $i$ and $j$
$v_{ij,q}$: traffic volume between PE $i$ and PE $j$ for VPN $q$
$\theta$: the maximum permissible increase in latency}
$\epsilon' \leftarrow \epsilon/3$
Transform the objective into one of (2)
while there is an unassigned virtual PE router do
  Set BestRatio $\leftarrow \infty$, BestSet $\leftarrow \emptyset$, BestHub $\leftarrow 0$
  for $h = 1$ to $n$ do {i.e. for each candidate hub}
    Let $S$ be the set of unsatisfied (less than $p$ times
    assigned) PE routers sp (possibly including $h$ itself) for
    which $h$ is not currently a hub, yet it is feasible, i.e.,
    $d(sp,h) + d(h,dst) - d(sp,dst) \leq \theta$ $\forall sp, dst$ with $v_{sp,dst} > 0$
    for each virtual PE $j=$(PE sp, VPN $q$) in $S$ do
      Let $c_j$ be total traffic it needs to send
      Let $e_j$ be the bandwidth usage cost for this assign-
      ment i.e., $\sum_d v_{j,d}[d(j,h) + d(h,dst) - d(sp,dst)]$
    end for
    Discretize $c_j$ and $e_j$ vals w.r.t. precisions $\epsilon'$ and $\delta$
    Let $\tau$ and $\kappa$ be the respective granularities
    for vpn $= 1$ to $k$ do
      run COSTWITHCAP(vpn)
    end for
    Run MAINDP(h)
    Run EXTRACTSOLUTION(h)
  end for
  Assign BestSet to BestHub
end while

COSTWITHCAP(VPN)

Algorithm 2 CostWithCap(vpn)
{For simplicity, we assume the VPEs in this VPN are
numbered from 1 to $n$}
Initialize $T'$[vpn,count,bwidth] to $\infty$ for all values
$T'$[vpn,0,0] $\leftarrow 0$ and $A'$[vpn,0,0] $\leftarrow \emptyset$
for cnt $= 1$ to $n$ do {$n$ is # of elements in this vpn}
  for bw $= 0$ to $b_i$ step $\kappa$ do
    for $i = 1$ to $n$ do
      if $e_i \leq$ bw and
      $T'$[vpn,cnt,bw] $> T'$[vpn,cnt-1,bw$-e_i$]$+c_i$ then
        $T'$[vpn,cnt,bw] $\leftarrow T'$[vpn,cnt-1,bw$-e_i$]$+c_i$
        $A'$[vpn,cnt,bw] $\leftarrow A'$[vpn,cnt-1,bw$-e_i$]$\cup\{i\}$
      end if
    end for
  end for
end for

MainDP(H)
```
Initialize DP table T[cost, vpn, served, bandwidth] ← ∞
T[f_h, 0, 0, 0] ← 0
A[f_h, 0, 0, 0] ← ∅
for vpn = 1 to k do
  for feasible values of (srvd, cst, bw) do
    T[cst, vpn, srvd, bw] ← T[cst, vpn-1, srvd, bw]
    A[cst, vpn, srvd, bw] ← A[cst, vpn-1, srvd, bw]
    for (s, b) where 1 ≤ s ≤ srvd and 0 ≤ b ≤ bw do
      c ← T'[vpn, s, b]
      if c ≤ cst and T[cst, vpn, srvd, bw] >
                     T[cst-c, vpn-1, srvd-s, bw-b] + s_vpn then
        T[cst, vpn, srvd, bw] ←
                     T[cst-c, vpn-1, srvd-s, bw-b] + s_vpn
        A[cst, vpn, srvd, bw] ←
                     A[cst-c, vpn-1, srvd-s, bw-b] ∪ A'[vpn, s, b]
      end if
    end for
  end for
end for
```

ExtractSolution(H)
```
MAX_COST ← f_h + min_{y∈s} c_y
for served = 1 to N do
  for cost = 0 to MAX_COST step τ do
    for bandwidth = 0 to b_i step κ do
      if T[cost, vpn, served, bandwidth] ≤ m_i
      and cost/served < BestRatio then
        BestRatio ← cost/served
        BestSet ← A[cost, vpn, served, bandwidth]
        BestHub ← i
      end if
    end for
  end for
end for
```

METHODS AND APPARATUS TO IMPLEMENT SCALABLE ROUTING IN NETWORK COMMUNICATION SYSTEMS

PRIORITY APPLICATION

This is a continuation of U.S. patent application Ser. No. 12/563,815, filed Sep. 21, 2009, which is hereby incorporated herein by reference in its entirety.

FIELD OF THE DISCLOSURE

The present disclosure relates generally to communication systems and, more particularly, to methods and apparatus to implement scalable routing in network communication systems.

BACKGROUND

Network service providers enable data communication services using networks interconnected via switches and routing devices including provider edge (PE) routers and customer edge (CE) routers. Customer edge routers communicatively couple customer equipment (e.g., computers and other processor systems, local routers, and local switches) to wide area networks (WANs) via PE routers. Provider edge routers are communicatively coupled to other PE routers across a WAN to enable communication between local CE routers (e.g., CE routers coupled to a particular PE router) and remote CE routers (e.g., CE routers coupled to different PE routers). To deliver data, each PE router is provided with routes (e.g., network paths) that can be used to forward data packets based on destination addresses stored therein. A PE router stores each route in a routing table, and retrieves that route from the routing table each time the PE router receives a data packet having a destination address matching the destination address associated with that route.

As service providers expand their networks, additional routes are brought on line to enable data communications with the new portions of the network. Each time an additional route is created, PE routers to which that route is relevant must store the route in their routing tables. As the quantity of routes increase, so do the requirements for memory capacity to store those routes in each router.

Enterprise customers having multiple locations or sites are increasingly adopting multi-protocol label switching (MPLS)-based virtual private network (VPN) services to implement communication networks among their respective sites via a service provider's network. Such MPLS-based VPNs provide direct any-to-any reachability among sites of the enterprise.

BRIEF DESCRIPTION OF THE DRAWINGS

FIG. 5 depicts an example virtual provider edge (VPE) router provisioning table showing VPE routers corresponding to virtual private networks (VPNs) installed or provisioned on respective physical PE routers.

FIG. 6 depicts a detailed block diagram of an example of a multi-VPN hub selector shown in FIG. 4.

FIG. 7 is example pseudo-code that can be used to implement the example process shown in the flow diagram of FIGS. 11A and 11B to select hub routers and assign spoke routers to those selected hub routers.

FIG. 8 is example pseudo-code that can be used to implement the example process shown in the flow diagram of FIGS. 12A and 12B to determine a spoke-to-hub assignment solution having a least memory utilization cost for a VPN having a particular VPN bandwidth usage.

FIG. 9 is example pseudo-code that can be used to implement the example process of FIGS. 13A and 13B to determine least memory utilization costs for a candidate hub to service different quantities of spoke routers, while not violating a maximum bandwidth usage capacity constraint of the candidate hub.

FIG. 10 is example pseudo-code that can be used to implement the example process of FIG. 14 to select an optimal or near-optimal spoke-to-hub assignment solution for a hub.

DETAILED DESCRIPTION OF THE DRAWINGS

Figure 1:
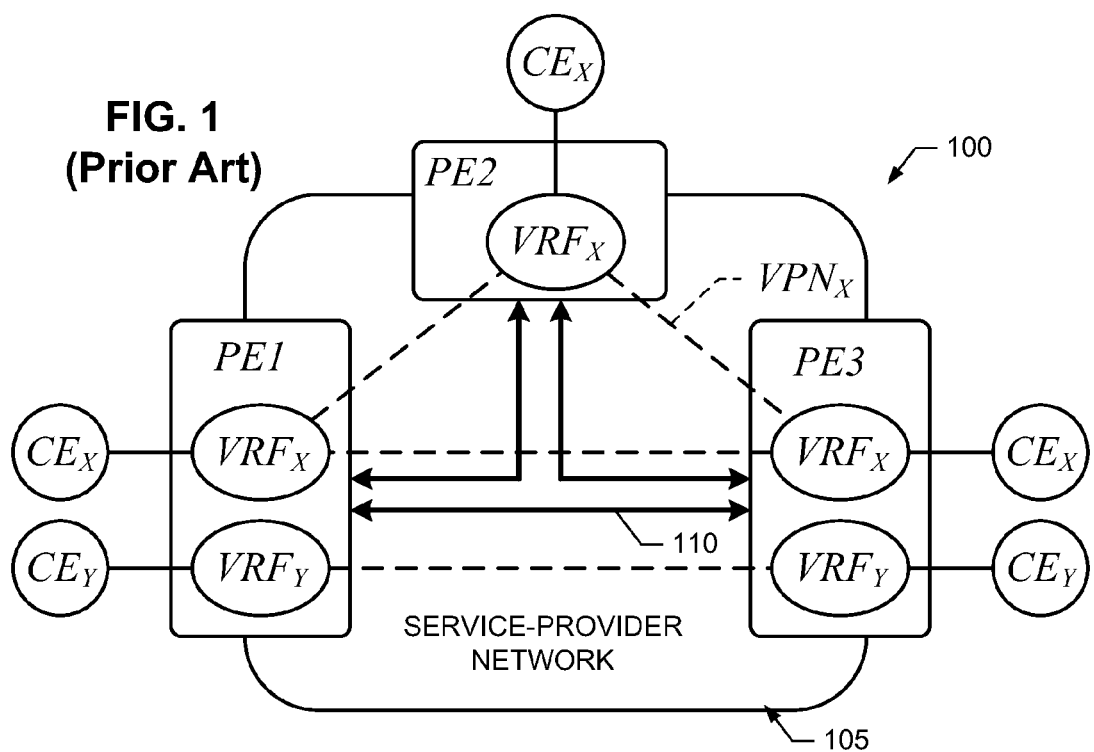
FIG. 1 is a schematic illustration of an example prior-art MPLS-based VPN.

The example methods and apparatus disclosed herein can be used to implement scalable multi-protocol label switching (MPLS) based networks having multiple virtual private networks (VPNs). Enterprise networks are increasingly adopting VPNs, including MPLS VPNs, to connect geographically separated locations of the enterprise. A VPN architecture, known as a Layer 3 MPLS VPN, typically offers direct any-to-any reachability among different customer sites of an enterprise. However, implementing such an any-to-any reachability model requires a relatively large memory footprint among provider routers to store possible routes, causing routing tables of those provider routers to grow very large (e.g., some VPNs can contain more than 10,000 routes). As a result, having sufficient memory is a significant hurdle for providing any-to-any reachability when provisioning customers on a Provider Edge (PE) router.

Relaying is a technique that can be used to reduce the PE memory footprint of VPNs by having select hub PE routers in each VPN maintain full reachability information (e.g., all routes) for that VPN, and enabling non-hub PEs (spoke PEs)

to maintain only partial reachability information (e.g., some routes), while being able to reach other routers by relaying communications through hub PE routers. Relaying techniques are disclosed in U.S. application Ser. No. 12/130,329, filed May 30, 2008, and titled "Scalable Multiprotocol Label Switching Based Virtual Private networks and Methods to Implement the Same," which is hereby incorporated herein by reference in its entirety.

The example methods and apparatus disclosed herein can be used to implement relaying techniques in a multi-VPN environment by selecting hub PE routers and spoke-to-hub assignments of spoke PEs based on how such selections and assignments affect the performance of all or at least some of the VPNs in the multi-VPN environment. For instance, while routing entries in routing tables are specific to each VPN, a provider network and individual PEs are shared resources serving many different VPNs. Thus, the techniques disclosed herein can be used to find optimal or near-optimal spoke-to-hub assignments associating spoke PEs to hub PEs based on network characteristics (e.g., traffic volumes, bandwidth usages, costs, etc.) and constraints (e.g., bandwidth constraints).

Different VPNs can have very different characteristics in terms of size, traffic patterns, and routing table sizes. Decisions made for one VPN, such as hub PE router selections, can affect the performance of other VPNs in different ways including, for example, the amount of available free PE router memory or the available free capacity on the ingress and egress links of a PE router available to all of the VPNs served by that PE router.

The example methods and apparatus disclosed herein involve a constraint optimization approach that may consider several factors including memory utilization and bandwidth usage constraints at each PE router, the cost of transporting traffic across the network, and the needs for maintaining fault-tolerant resilience for each VPN to withstand network failures. The constraint optimization approach is implemented using a cost model analysis based on several constraints to observe the potential impacts on different VPNs in a multi-VPN environment that would result from selecting different PE routers as hubs and creating certain spoke-to-hub assignments for spoke PEs. In the example implementations described herein, the cost model reflects: (a) the fixed cost associated with the procurement, deployment, and maintenance of each physical PE router; (b) the utilization cost indicative of the capacities of the physical PE routers used by the VPNs; and (c) the transport cost indicative of the distance traversed by traffic that is relayed. Fixed costs associated with a PE router include costs to cover the hardware purchase, the deployment costs, and the maintenance costs regardless of the usage (e.g., bandwidth usage of memory utilization) of the PE router. Utilization costs are a function of multiple router resources including the memory utilization that is driven by the number of routes installed (i.e., ratio of memory used on a PE router to the total memory available), the central processing unit (CPU) utilization that is driven by border gateway protocol (BGP) sessions, customer features and traffic load, and the number of spare ports available on a particular router. The transport cost is a function of communication latency because the added distance traversed in a backbone is approximately proportional to the added latency. The transport cost is a direct cost for a provider because it involves additional resource consumption on a provider network backbone due to the increase in the distances traversed by traffic that is relayed through hub PE routers.

As disclosed herein, some example methods involve selecting a plurality of virtual private networks in a communication network and selecting a candidate hub router from a plurality of routers in the communication network. The example methods also involve determining a spoke-to-hub assignment solution having a least memory utilization cost relative to a plurality of other spoke-to-hub assignment solutions. Each of the spoke-to-hub assignments solution and the plurality of other spoke-to-hub assignment solutions has a different proposed combination of spoke routers assigned to a candidate hub router. In addition, the example methods involve determining a spoke router quantity associated with a least memory utilization relative to a plurality of other spoke router quantities. Each of the spoke router quantity and the plurality of other spoke router quantities are representative of different quantities of spoke routers proposed to be assigned to the candidate hub router. Also, the example methods involve determining whether to configure the candidate hub router to operate as a hub router for one of the proposed combination of spoke routers based on the least memory utilization cost and the spoke router quantity associated with the least memory utilization.

In accordance with other example methods disclosed herein, a plurality of virtual private networks in a communication network are selected and a candidate hub router from a plurality of routers in the communication network is also selected. The example methods also involve determining a plurality of least memory utilization costs associated with assigning different quantities of spoke routers to the candidate hub router. Each of the least memory utilization costs and corresponding quantity of spoke routers is associated with a corresponding one of the plurality of virtual private networks. For each of the least memory utilization costs, a bandwidth usage of a corresponding one of the quantities of spoke routers is identified. The candidate hub router is selected to operate as a hub router for one of the quantities of spoke routers associated with a corresponding one of the bandwidth usages that does not exceed a bandwidth capacity of the candidate hub router.

Figure 4:
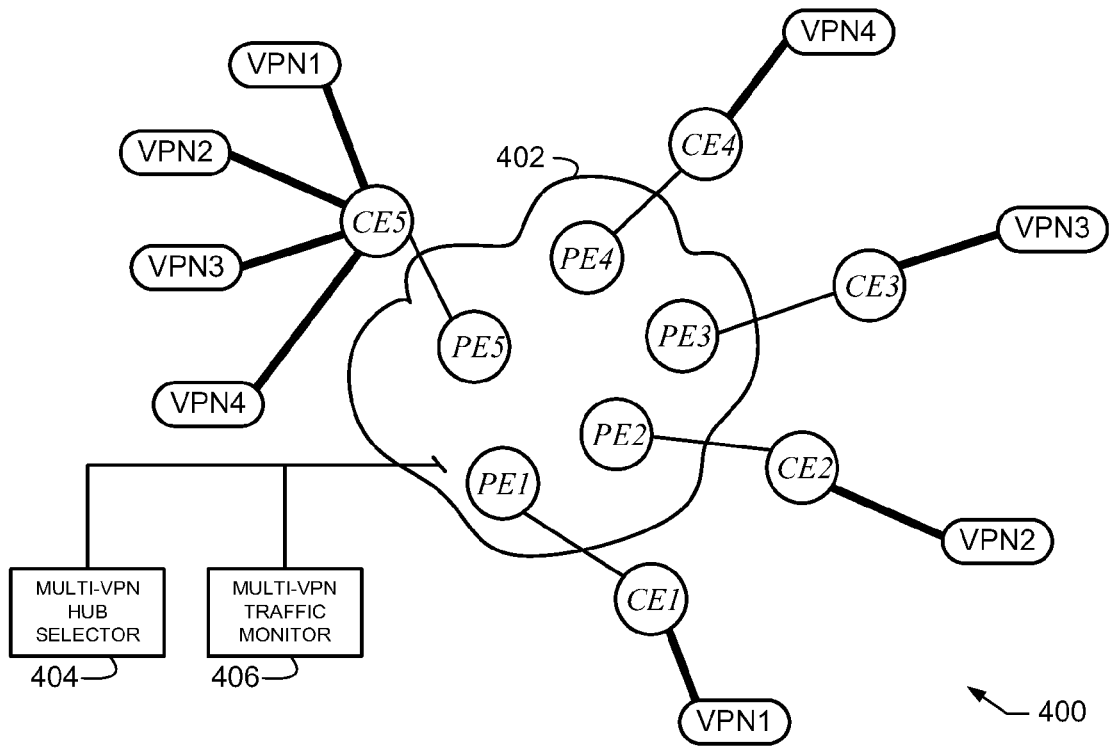
FIG. 4 depicts an MPLS-based multi-VPN network in which the example methods and apparatus described herein can be implemented.

Throughout the following disclosure references are made to the example MPLS-based multi-VPN network 400 of FIG. 4. However, the methods and apparatus described herein to implement scalable routing are applicable to other types of networks constructed using other network technologies, topologies, and/or protocols.

Turning now to FIG. 1, an example prior-art MPLS-based VPN network 100 includes a service-provider network 105 to facilitate communications between a plurality of customer edge (CE) routers CEx and CEy. The example service-provider network 105 of FIG. 1 includes a plurality of PE routers, three of which are designated at reference numerals PE1, PE2 and PE3. The example PE routers PE1, PE2, and PE3 of FIG. 1 are communicatively coupled to each other via a plurality of communication paths (one of which is designated at reference numeral 110) that allow any of the PE routers PE1, PE2 and/or PE3 to communicate directly with any of the other PE routers PE1, PE2 and PE3.

For each VPN implemented by the service-provider network 105 (e.g., a VPNx communicatively coupling the CEx routers), each of the example PE routers PE1, PE2 and PE3 of FIG. 1 has a virtual routing and forwarding (VRF) table (e.g., VRFx for the VPNx coupling the CEx routers). VRF tables define which PE router(s) are used to communicatively couple CE routers to a particular VPN. As described below in connection with FIG. 2, the VRF tables are used by the PE routers PE1-PE3 to route and/or forward a packet received at a particular PE router PE1, PE2 or PE3 to its final destination.

Figure 2:
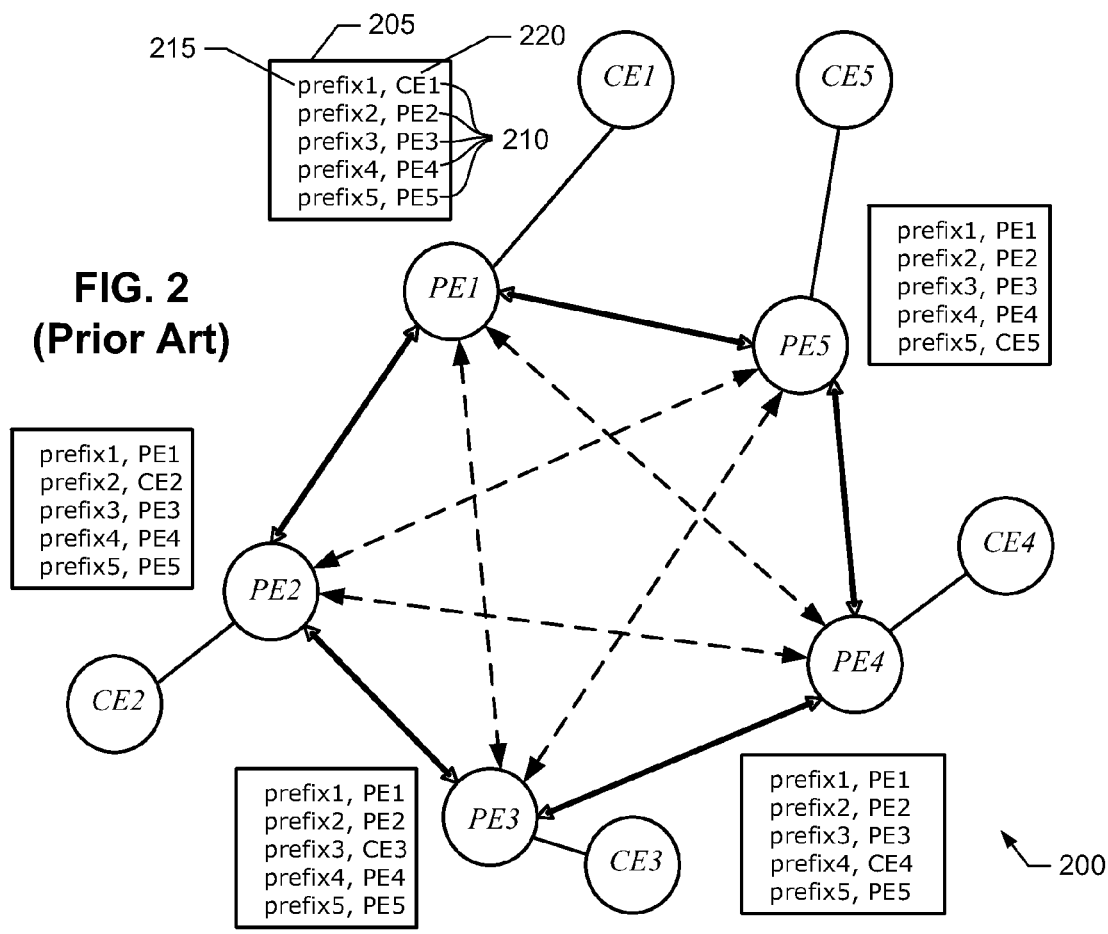
FIG. 2 is a schematic illustration of example prior-art virtual routing and forwarding tables for an MPLS-based VPN.

FIG. 2 illustrates an example MPLS-based VPN 200 constructed using five PE routers PE1-PE5. Also shown are CE routers CE1-CE5, each of which is communicatively coupled to the VPN 200 via a corresponding PE router PE1-PE5. While only one VPN 200 is shown in FIG. 2, any number of VPNs can be constructed via the example PE routers PE1-PE5. Moreover, more than one CE router could be connected to any of the PE routers PE1-PE5. Further, a CE router CE1-CE5 could be connected to more than one PE router PE1-PE5 for load balancing or backup purposes.

Each of the example PE routers PE1-PE5 of FIG. 2 has an associated VRF table, one of which is designated at reference numeral 205 in FIG. 2. Each of the example VRF tables 205 of FIG. 2 contains a plurality of entries 210 for respective ones of the CE routers (e.g., CE1-CE5) communicatively coupled via the VPN 200. In the illustrated example of FIG. 2, each of the VRF tables 205 contains an entry 210 for each of the CE routers CE1-CE5 of the VPN 200. By having an entry 210 for each of the CE routers CE1-CE5, the example PE routers PE1-PE5 of FIG. 2 implement direct any-to-any communications amongst the CE routers CE1-CE5.

To identify a particular CE router CE1-CE5, each of the example entries 210 of FIG. 2 includes a prefix field 215. Each of the example prefix fields 215 of FIG. 2 contains one or more numbers and/or letters that represent all or a portion of an address and/or label that uniquely identifies a particular CE router CE1-CE5.

To identify how a packet addressed to a particular CE router CE1-CE5 is to be routed, each of the example entries 210 of FIG. 2 includes a reference field 220. Each of the example reference fields 220 of FIG. 2 contains one or more numbers and/or letters that represent the MPLS label of a CE router CE1-CE5 or a PE router PE1-PE5.

When a packet is received at a PE router PE1-PE5 from a CE router CE1-CE5, the PE router PE1-PE5 uses the final destination of the packet to perform a query of its VRF table 205. The PE router PE1-PE5 performs the query by comparing the final destination address or label contained in a header of the packet with prefixes in the prefix fields 215. Based on the query, the PE router PE1-PE5 determines how the packet is to be routed or forwarded. If the reference field 220 associated with the destination prefix contains a reference to another PE router PE1-PE5, the PE router PE1-PE5 prepends an MPLS label corresponding to the identified PE router PE1-PE5 to the packet, and forwards the prepended packet to the identified PE router PE1-PE5. If the reference field 220 contains a reference to a CE router CE1-CE5 communicatively coupled to the VPN, the PE router PE1-PE5 routes the packet to the CE router CE1-CE5 without prepending an MPLS label.

When a packet is received at a PE router PE1-PE5 from another PE router PE1-PE5, the PE router PE1-PE5 removes the prepended MPLS label, performs a query of its VRF table 205 to identify whether the CE router CE1-CE5 to which the packet is addressed is coupled to the VPN via the PE router PE1-PE5. If the identified CE router CE1-CE5 is coupled to the VPN via the PE router PE1-PE5, the PE router PE1-PE5 delivers the packet to the identified CE router CE1-CE5.

Figure 3:
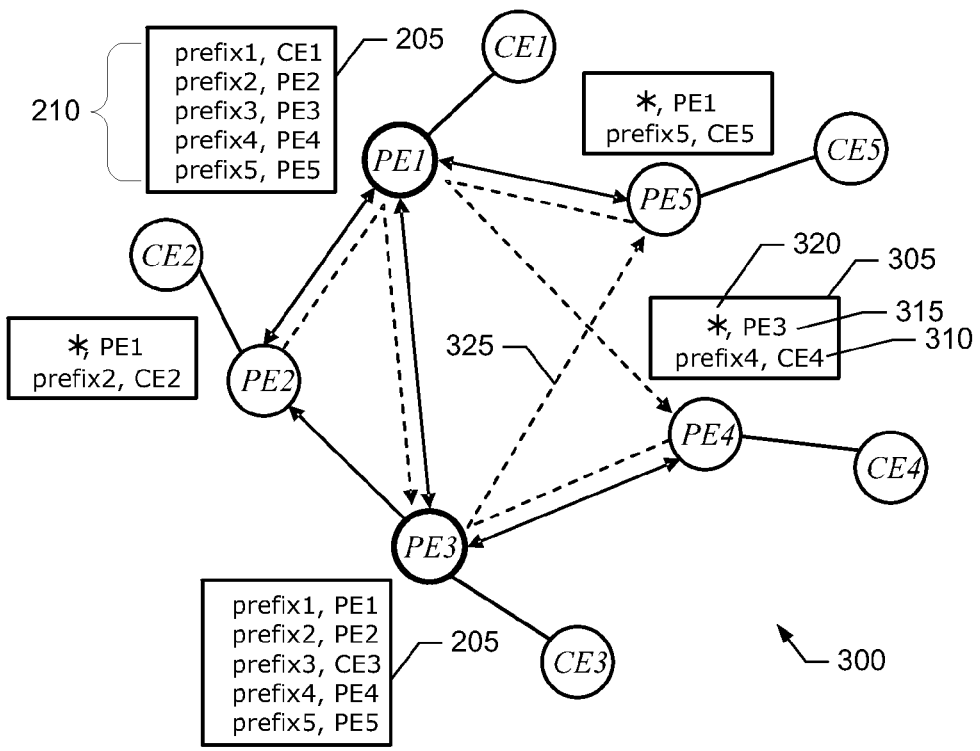
FIG. 3 is a schematic illustration of an example scalable MPLS-based VPN configured to deliver data using relaying techniques.

FIG. 3 illustrates an example MPLS-based VPN 300 configured to route data using a relaying technique disclosed in U.S. application Ser. No. 12/130,329. The example MPLS-based VPN 300 of FIG. 3 has the same configuration of PE routers PE1-PE5 and CE routers CE1-CE5 described above in connection with FIG. 2. Like the example VPN 200 of FIG. 2, two of the example PE routers (i.e., routers PE1 and PE3) of FIG. 3 have VRF tables 205 that contain an entry 210 for each of the CE routers CE1-CE5 of the VPN 300. Routers such as PE1 and PE3 that have complete VRF tables are referred to herein as "hub routers." The remaining PE routers (i.e., routers PE2, PE4 and PE5) are referred to herein as "spoke routers." The spoke routers have truncated VRF tables (one of which is designated at reference numeral 305) that do not contain an entry for every CE router in the VPN 300. For instance, in the illustrated example, the truncated VRF table 305 contains one or more entries 310 that reference one or more CE routers communicatively coupled to the spoke PE router PE4 corresponding to the truncated VRF table 305. In addition, the VRF table 305 includes an entry 315 that references one or more of the hub routers PE1, PE3. The example entry 315 has a prefix field 320 of "*" to indicate that the entry corresponds to a default entry to be used for a destination that does not match one of the entries 310 (i.e., does not correspond to a CE router CE1-CE5 coupled to the spoke router PE4).

Because the example spoke routers PE2, PE4 and PE5 of FIG. 3 do not have VRF tables 205 that contain references to all of the CE routers CE1-CE5, the example MPLS-based VPN 300 of FIG. 3 is defined to operate in a logical hub and spoke arrangement. A spoke router PE2, PE4, and PE5 only communicates (1) with its associated CE routers (i.e., those CE routers that are coupled to the VPN 300 via the spoke router) and (2) with a corresponding hub router PE1, PE3. For a packet received at a spoke router PE2, PE4, PE5 that is not addressed to a CE router associated with the spoke router PE2, PE4, PE5, the spoke router PE2, PE4, PE5 forwards the packet via its associated hub router PE1, PE3. For example, a packet addressed to CE5, which is received from CE4 at spoke router PE4, is relayed via the hub router PE3 to the spoke router PE5 (as signified by line 325), because the hub router PE3 is designated in the truncated VRF of the spoke router PE4 and there is no entry 310 for CE5. Even though some packets are delivered indirectly or relayed through a hub router PE1, PE3, each CE router CE1-CE5 is still able to communicate with any of the CE routers CE1-CE5. Because each of the hub routers PE1, PE3 maintains a full or complete VRF table referencing all of the CE routers CE1-CE5 of the VPN 300, multi-hop delivery across multiple hub routers PE1, PE3 is not required. This relaying technique substantially reduces the collective PE memory space needed to implement the any-to-any connectivity available to MPLS VPNs by reducing the memory space required on the spoke routers PE2, PE4, PE5.

FIG. 4 depicts an example MPLS-based multi-VPN network 400 in which the example methods and apparatus disclosed herein can be implemented. In the illustrated example, the multi-VPN network 400 includes PE routers PE1-PE5, CE routers CE1-CE5, and VPNs VPN1-VPN4 established via the PE routers PE1-PE5 and CE routers CE1-CE5. Each of the PE routers PE1-PE5 is directly connected to a respective one of the CE routers CE1-CE5 as shown. In addition, although not shown, each of the PE routers PE1-PE5 may be directly or indirectly connected to others of the PE routers PE1-PE5. Regardless of indirect or direct connectivity between the PE routers PE1-PE5, each of the PE routers PE1-PE5 can forward data packets to others of the PE routers PE1-PE5 through direct or indirect communication to enable communications via the VPNs VPN1-VPN4. Although the PE routers PE1-PE5 are shown within a single service provider network 402, in other example implementations, the PE routers PE1-PE5 can be implemented in two or more different service provider networks.

Each of the PE routers PE1-PE5 can have installed on it one or more of the VPNs VPN1-VPN4. For example, one of the PE routers PE1-PE5 can carry traffic for one or more of the VPNs VPN1-VPN4, while another one of the PE routers PE1-PE5 can carry traffic for one or more of the same or different ones of the VPNs VPN1-VPN4. When a VPN is installed on a PE router (i.e., a physical PE router), a virtual PE (VPE) router is created. A virtual PE router is a logical representation of the portion of a PE router that serves a particular VPN. When two or more VPNs are installed on a single PE router, the same number of VPE routers are created on that PE router. Each VEP router corresponds to a respective logical portion of the PE router that serves a corresponding one of the installed VPNs. Turning briefly to FIG. 5, an example VPE provisioning table 500 shows VPE routers corresponding to VPNs installed or provisioned on respective PE routers. In the illustrated example of FIG. 5, a VPE router VPE1 is a logical portion corresponding to the installation of VPN1 on physical PE router PE1. In addition, a VPE router VPE2 is a logical portion corresponding to the installation of VPN2 on physical PE router PE1. Thus, in the illustrated example, because the physical PE router PE1 serves at least two different VPNs (VPN1 and VPN2), the PE router PE1 has at least two logical portions indicated as VPE router VPE1 and VPE router VPE2.

Returning to FIG. 4, the example methods and apparatus disclosed herein can be used to implement relaying communications between the PE routers PE1-PE5 for multiple VPNs installed on the PE routers PE1-PE5 by selecting certain ones of the PE routers PE1-PE5 to operate as hub PE routers, while others of the PE routers PE1-PE5 operate as spoke PE routers assigned to respective ones of those hub PE routers. In the illustrated example of FIG. 4, communication paths between the PE routers PE1-PE5 are not shown. However, such communication paths can be direct communication paths in which one PE router communicates directly with another PE router or indirect communication paths in which one PE router communicates with another PE router indirectly through one or more other PE routers. Whether the PE routers PE1-PE5 communicate directly or indirectly with one another is dictated by which of the PE routers PE1-PE5 are selected to operate as hub PE routers using the techniques discussed in detail below and which of the PE routers PE1-PE5 operate as spoke PE routers.

To select which of the PE routers PE1-PE5 are to operate as hub routers and which are to operate as spoke routers, the example network 408 is provided with an example multi-VPN hub selector 404 and an example multi-VPN traffic monitor 406. The multi-VPN traffic monitor 406 monitors the links connecting each of the PE routers PE1-PE5 to its adjacent one or more of the PE routers PE1-PE5 using, for example, the Cisco Systems® NetFlow Services Export protocol. Records collected by the multi-VPN traffic monitor 406 allow the source, destination and volume of flows to be measured and/or recorded. Traffic data may be collected by the multi-VPN traffic monitor 406 over any interval(s) of time, such as weeks.

Using the traffic data collected by the multi-VPN traffic monitor 406, the multi-VPN hub selector 404 selects which of the PE routers PE1-PE5 are to serve as hub routers. In the illustrated example of FIG. 4, the example multi-VPN hub selector 404 selects hub routers and determines spoke-to-hub assignments by finding candidate hubs (i.e., PE routers that could be configured to operate as hub routers) and spoke-to-hub assignments that minimize the cost represented by the example cost model of equation 1 below.

$$\text{cost} = \alpha|H| + \beta \sum_{ijk} v_{ijk} l_{ijk} + \gamma \sum_{i} u_i \qquad \text{Equation 1}$$

In equation 1 above, the coefficients ($\alpha$), ($\beta$), and ($\gamma$) (used as multipliers) represent monetary costs, (|H|) is the number of hub PE routers, ($u_i$) is the memory utilization of PE router (i), ($v_{ijk}$) is the traffic volume exchanged between PE router (i) and PE router (j) for VPN (k) during a particular instance in time or duration (i.e., traffic volume per time (Mbps), ($l_{ijk}$) is the additional latency due to the additional distance d(i, hub (i,k))+d(hub(i,k), j)−d(i,j) where hub(i,k) is the hub assigned to PE router (i) for VPN (k) and d(i,j) is the distance between PE router (i) and PE router (j). In equation 1, the coefficient multipliers ($\alpha$), ($\beta$), and ($\gamma$) enable converting the PE router and VPN operating characteristics of memory utilization ($u_i$), traffic volume per time ($v_{ijk}$) (i.e., bandwidth usage), and latency ($l_{ijk}$) to a monetary cost. In this manner, the operating characteristics associated with a multi-VPN network (e.g., the multi-VPN network 400 of FIG. 4) can be compared to one another and analyzed on a common monetary cost basis.

In the cost model of equation 1, a fixed equipment cost coefficient (a) is used to determine the costs associated with the procurement, deployment, and maintenance of each physical PE router (e.g., the PE routers PE1-PE5); the utilization cost coefficient ($\beta$) is used to determine the costs associated with the capacities of the physical PE routers utilized by the VPNs (e.g., the VPNs VPN1-VPN4 of FIG. 4); and the transport cost coefficient ($\gamma$) is used to determine the costs associated with the distance traversed by traffic that is relayed. Fixed equipment costs ($\alpha|H|$) associated with a PE router include costs to cover the hardware purchase, the deployment costs, and the maintenance costs regardless of the usage of the PE router. Utilization costs ($\beta\Sigma_{ijk}v_{ijk}l_{ijk}$) are a function of multiple resources including the memory utilization that is driven by the number of routes installed (i.e., ratio of memory used on a PE router to the total memory available), the CPU utilization that is driven by border gateway protocol (BGP) sessions, customer features and traffic load, and the number of spare ports available. The transport cost ($\gamma\Sigma_i u_i$) is a function of latency because the added distance traversed in a backbone is approximately proportional to the added latency. The transport cost ($\gamma\Sigma_i u_i$) is a direct cost for a provider because it involves additional resource consumption on a provider network backbone due to the increase in the distances traversed by traffic that is relayed through hub PE routers.

The multi-VPN hub selector 404 can re-evaluate the cost model of equation 1 on a periodic or aperiodic basis as network needs or characteristics change. During each evaluation of the cost model, the multi-VPN hub selector 404 can compare the costs of selecting different hub routers and spoke-to-hub assignment solutions. Each spoke-to-hub assignment solution has one of the PE routers PE1-PE5 selected to operate as a hub router and one or more others of the PE routers PE1-PE5 assigned as spokes to the hub router. Based on the cost comparisons, the multi-VPN hub selector 404 can determine which spoke-to-hub assignment solution results in the minimum or near-minimum cost. For example, the multi-VPN hub selector 404 can evaluate the cost model for a spoke-to-hub assignment solution and compare that cost to another cost associated with another spoke-to-hub assignment solution. In similar manner, the multi-VPN hub selector 404 can compare other costs associated with different spoke-to-hub assignments. The multi-VPN hub selector 404 can then select one or more of the spoke-to-hub assignment solutions for each VPN that result(s) in a minimum or near-minimum cost.

In some example implementations, constraints can also be used as additional factors in selecting spoke-to-hub assignments. That is, spoke-to-hub assignments can be selected while minimizing the cost represented by the cost model of equation 1 so long as certain constraints are not violated. An example constraint is a reliability constraint, which requires that communication paths remain reliable even during the failure of a particular number of PE routers. To ensure such reliability, each spoke PE router can be assigned to a certain quantity of hubs equal to a reliability parameter ($\rho$), for a constant integer ($\rho$>0), to provide a topology that is survivable when up to ($\rho$−1) PE router failures occur. Thus, each VPE router (e.g., the VPE routers VPE1-VPE3 of FIG. 5) should be connected to at least a number of hubs equal to a value of the reliability parameter ($\rho$).

Another example constraint is a latency constraint, which can require that no packet incurs a latency increase of more than a maximum latency parameter ($\theta$) so that the experience of the end user is not impacted by the relaying architecture. To avoid such an increased latency, a spoke router should not be assigned (e.g., logically connected) to a hub router if doing so would increase the latency of the spoke router to be more than a value of the latency parameter ($\theta$) by forcing traffic from the spoke router to pass through the (intermediate) hub router.

Yet another example constraint is a bandwidth usage limit constraint ($b_i$), which can require that the total traffic volume during a given duration (i.e., bandwidth usage) through any single PE router (i) should not exceed a bandwidth limit value. Another example constraint is a memory utilization limit constraint, which defines the maximum number of routes that can be stored in a VRF table of any single PE router. In this manner, the memory utilization of any single PE router is bounded by a configurable memory utilization upper limit (i.e., a memory limit value).

In addition to minimizing the cost represented by the cost model of equation 1, hub routers and spoke-to-hub assignment solutions can be selected in a manner that balances the routing table size across the PE routers PE1-PE5. In this manner, network provisioning teams can more easily provision new customers on any PE router. Such balancing of routing table size can be achieved by changing the memory utilization constraint to lower the memory utilization allowed.

In some example implementations, certain approximations and assumptions can be made to facilitate finding optimal or near-optimal spoke-to-hub assignment solutions that will satisfy a minimal or near-minimal cost represented by the cost model of equation 1. For instance, a minimal or near-minimal cost can be found using practical approximation algorithms with approximation factors (C). Such approximation algorithms may not necessarily result in finding the most optimal spoke-to-hub assignment solution, but the solutions that can be found using these algorithms have costs within a factor (C) of the optimum solution. Also, while solving for the minimal or near-minimal cost, certain assumptions regarding characteristics of PE routers can be made. For instance, because memory is the property of PE routers most affected when implementing routing tables, the cost model of equation 1 above can be evaluated assuming that PE utilization ($u_i$) represents memory utilization, which is proportional to the number of routes installed in a hub router. In addition, the cost model can be evaluated assuming that the transport cost is linear and proportional to the distance traversed ($l_{ijk}$) and that the cost of traffic traversing the network for the weighted average distance of today's traffic is, for example, $4 per Mbps. In the illustrated examples described herein, the cost of PE routers will vary linearly with the memory utilization and be amortized over 36 months. More specifically, the up-front or initial cost for a PE router is assumed to be, for example, $200K when empty and reach a total cost of, for example, $400K if the memory is fully utilized.

In some example implementations, the cost model of equation 1 can be simplified to implement hub selection and spoke-to-hub assignment processes. In particular, an example cost model of equation 2 below shows a simplified form of the cost model shown in equation 1 above.

$$\text{cost} = \sum_{i \in H} f_i + \sum_{i,j,k} v_{ijk} l_{ijk} \qquad \text{Equation 2}$$

A model instance ($I_1$) based on the cost model of equation 1 can be transformed into a model instance ($I_2$) that is based on the cost model of equation 2. As shown, the cost model of equation 2 does not have the third term (i.e., the memory utilization term ($\Sigma_i u_i$)) of the cost model of equation 1, nor does it have the coefficient multipliers ($\alpha$), ($\beta$), and ($\gamma$). Instead, the cost model of equation 2 accounts for the initialization costs of selected hubs (H) and for the costs associated with traffic volume per time ($v_{ijk}$) (i.e., bandwidth usage) and latency ($l_{ijk}$) to effectively select optimal or near-optimal hub selections and spoke-to-hub assignment solutions as could otherwise be selected using the cost model of equation 1. The simplification of equation 2 enables performing analyses similar to those that could be performed using equation 1, while using a relatively less complex process implementation to perform such analyses.

The similarity of the cost models of equation 1 and equation 2 can be shown as follows. For any constant bandwidth cost error factor ($\epsilon'>0$), an instance ($I_1$) satisfying the cost model in the form of equation 1 can be transformed in polynomial time to an instance ($I_2$) satisfying the simplified cost model of the form of equation 2 with a blowup factor of at most (1+$\epsilon'$). If a particular one of the PE routers PE1-PE5, referred to as router ($R_i$), is made a hub and gets a memory utilization ($u_i$), then it pays a price of ($\alpha + \gamma u_{ij}$) in the cost model of equation 1. In the second instance ($I_2$), multiple ones of the PE routers PE1-PE5 are used to model the router ($R_i$) of the first instance ($I_1$). Each of the PE routers of the second instance ($I_2$) has a particular memory limit (spanning the range from zero to ($U_i$), which is the total memory of the modeled router ($R_i$)). The cost of such a set of PE routers of the new instance ($I_2$) is ($\alpha + \gamma U_{ij}$), where ($U_{ij}$) is the new memory limit of the set of PE routers. Thus, analyzing a relatively small number of sets of PE routers suffices to satisfy the blowup factor bound of at most (1+$\epsilon'$).

A hub selection process using the cost model of equation 2 above can be implemented by greedily selecting an (approximately) most efficient hub to which a set of VPE routers is assigned and subsequently selecting other hubs until all VPEs have been assigned to those hubs. At each step of the process, there is a set of yet unassigned VPEs and the target is to find the most efficient hub (i.e., a hub whose selection cost divided by the number of VPEs it satisfies—is assigned to—is a minimum) for some of them. To assign a candidate hub to one or more VPEs (j), a quantity (n) of VPEs (items) are partitioned into (k) VPNs (groups). Each VPN has a memory footprint $s_i$ (number of routes needed for this VPN in each hub), and each VPE (j) has a bandwidth cost $c_j$ (summation of traffic volume multiplied by the latency increase for the traffic volume per time (i.e., bandwidth usage) generated at that particular VPE). In addition, a global one-time-pay cost F (i.e., F=$f_h$ if the hub is fixed to be h). Denoting the group of VPNs using (V), and denoting the set of VPEs corresponding to VPN (i) using ($P_i$), the target is to: (1) pick some VPNs V' ⊂ V having a total memory footprint that does not exceed a memory capacity (M) of the current hub (i.e., $\Sigma_{i \in V'} s_i \leq M$); (2) deploy their memory footprint in the memory of the current hub; and (3) use the current hub to serve some VPEs from each of the selected VPNs (i.e., serve a subset of $U_{i \in V'} P_i$) to minimize the ratio of cost-to-quantity of VPEs served by the hub. In addition, the sum of the bandwidth usages ($v_j$) for each VPE should not exceed a bandwidth limit (B) for the hub.

In some example implementations, VPEs can be assigned to hub routers while ignoring bandwidth limits (B) for those hubs and reliability requirements. For instance, assuming costs are small integers, the cost model of equation 2 can be solved using a dynamic programming (DP) technique. For example, c(i,l) can denote the sum of the bandwidth costs ($v_j$) of the (l) cheapest VPEs in VPN (i). The DP can be implemented by selecting a quantity (l) of VPEs from the VPN (i) and using the selected VPEs to populate a data structure D(i,m,c), which defines the minimum memory usage required to serve (m) VPEs (items) from VPNs 1 through (i) at a bandwidth usage cost (c). Finally, the best spoke-to-hub assignment solution whose memory utilization does not exceed the memory capacity (M) can be selected by analyzing the table for (i=k) (k is the number of VPNs). In this manner, in example implementations in which costs are assumed to be small integers, VPEs can be assigned to hub routers while ignoring bandwidth limits (B) and reliability requirements.

In other example implementations, in which costs are not assumed to be small integers, VPEs can be assigned to hub routers using techniques similar to a Polynomial-Time Approximation Scheme (PTAS) (i.e., a (1+$\epsilon$)-approximation algorithm for any $\epsilon$>0) for a standard knapsack problem. In a standard knapsack problem there is a knapsack capacity (e.g., the bandwidth usage cost (c)) and a number of items, each having an associated value and an associated weight, and the goal is to find a maximum-value subset of items whose total weight is less than or equal to the knapsack capacity (c). Using this approach, the instance ($I_2$) (for a particular hub router) is modified to be an instance ($I_3$), in which all bandwidth usage costs (c) and bandwidth usage values (v) have been discretized to be integer multiples of some granularity (a bandwidth cost granularity (t) and a bandwidth usage granularity (K)). The instance ($I_3$) can be used because it is approximately equivalent to the instance ($I_2$). That is, the value of the optimum solution for the instance ($I_2$) is no better than that of the instance ($I_3$). In addition, any solution of the instance ($I_3$) having a bandwidth cost (C') is a solution for the instance ($I_2$) in which memory utilization is the same, bandwidth cost is at most (1+$\epsilon$')C multiplied by the bandwidth cost of the instance ($I_3$), and bandwidth usage is at most (1+$\delta$)B.

Using techniques similar to PTAS for the knapsack problem, the goal is to find a VPE assignment for a hub router that is of minimum density (i.e., minimize the ratio of cost-to-quantity of VPEs satisfied). That is, an optimal or near-optimal spoke-to-hub assignment is one that involves assigning the highest or near-highest quantity (N) of VPEs to a single hub while maintaining a lowest or near-lowest possible cost. A cost-to-quantity ratio is used to facilitate evaluation of this measure. For instance, assuming a facility cost (F) for the hardware of a physical PE router and assuming the cheapest VPE has a (bandwidth) cost (L), the best density is at most (F+L), since one possibility is to only serve the cheapest VPE. Thus, all VPEs costlier than (F+L) can be ignored. For a given bandwidth cost error factor $\epsilon$'>0, bandwidth cost granularity can be defined to be $\tau$=$\epsilon$'(F+L)/N, and costs are rounded down to the next integer multiple of the bandwidth cost granularity ($\tau$). In addition, the bandwidth usage granularity can be defined as $\kappa$=$\delta$B/N, where (B) is the bandwidth limit of the current hub and ($\delta$) is a bandwidth usage error factor. The number of distinct cost values is at most the number (N) of VPEs divided by the cost error factor ($\epsilon$') (i.e., N/$\epsilon$'), and the number of distinct bandwidth usage values is at most the number (N) of VPEs divided by the bandwidth usage error factor ($\delta$) (i.e., N/$\delta$). Thus, these values can be divided by the bandwidth cost granularity ($\tau$) and the bandwidth usage granularity ($\kappa$), respectively to get an instance in which bandwidth costs and bandwidth usage values are polynomially bounded integers. This facilitates using a dynamic programming process to find an instance ($I_3$) that will satisfy assigning a number of VPEs to a particular hub router.

Turning now to FIG. 6, a detailed block diagram of the multi-VPN hub selector 404 of FIG. 4 is shown. To collect traffic data, the multi-VPN hub selector 404 is provided with a traffic data collector 602. The traffic data collector 602 periodically or aperiodically collects measured and/or recorded traffic data pertaining to traffic volumes across the PE routers PE1-PE5. The traffic data can be measured and/or recorded by the multi-VPN traffic monitor 406 of FIG. 4.

To select hub routers and assign spoke routers to those hub routers, the multi-VPN hub selector 404 is provided with a multi-VPN hub selection module 604. In the illustrated example, the hub selection module 604 can find spoke-to-hub assignments based on the cost models of equations 1 and 2 above until every VPE router is assigned to at least a minimum reliability number ($\rho$) of hub routers. The hub selection module 604 performs the spoke-to-hub assignment process as discussed below in connection with the pseudo-code and flow diagrams of FIGS. 7-10, 11A, 11B, 12A, 12B, 13A, 13B, and 14 based on constraint parameters, usage parameters, and cost parameters.

To store constraint information such as maximum usage values, maximum cost values, reliability constraints, etc., the multi-VPN hub selector 404 is provided with a constraints database 606. To store cost information associated with PE router procurement costs, PE router deployment costs, PE router maintenance costs, bandwidth costs (e.g., cost per Mbps), etc., the multi-VPN hub selector 404 is provided with a costs database 608. The constraints database 606 and the costs database 608 may be stored in any number and/or type(s) of memory(-ies) and/or memory device(s) using any number and/or type(s) of data structures.

The hub selection module 604 may periodically (e.g., once a week) or aperiodically (e.g., upon occurrence of an event) update or change hub selections and spoke-to-hub assignments. This allows the MPLS-based multi-VPN network 400 of FIG. 4 to be adapted and/or re-optimized over time as traffic patterns change.

To configure and/or provision hub and spoke routers, the multi-VPN hub selector 404 includes a BGP policy manager 610. Based upon hub router selections made by the hub selection module 604, the example BGP policy manager 610 creates, generates, customizes, installs, configures and/or provisions corresponding BGP policies and/or configurations into the example PE routers PE1-PE5 of FIG. 4. Such example BGP policies are described in U.S. application Ser. No. 12/130,329.

While an example manner of implementing the multi-VPN hub selector 404 of FIG. 4 has been illustrated in FIG. 6, one or more of the interfaces, data structures, elements, processes and/or devices illustrated in FIG. 6 may be combined, divided, re-arranged, omitted, eliminated and/or implemented in any other way. Further, the traffic data collector 602, the hub selection module 604, the constraints database 606, the costs database 608, the BGP policy manager 610 and/or, more generally, the multi-VPN hub selector 404 of FIG. 6 may be implemented by hardware, software, firmware and/or any combination of hardware, software and/or firmware. Thus, for example, any or all of the traffic data collector 602, the hub selection module 604, the constraint database 606, the costs database 608, the BGP policy manager 610 and/or, more generally, the multi-VPN hub selector 404 may be implemented by one or more circuit(s), programmable processor(s), ASIC(s), PLD(s) and/or FPLD(s), etc. When any of the appended apparatus claims are read to cover a purely software implementation, at least one of the traffic data collector 602, the hub selection module 604, the constraint database 606, the costs database 608, the BGP policy manager 610 and/or, more generally, the example multi-VPN hub selector 404 are hereby expressly defined to include a tangible medium such as a memory, a DVD, a CD, etc. Further still, a border element may include interfaces, data structures, elements, processes and/or devices instead of, or in addition to, those illustrated in FIG. 6 and/or may include more than one of any or all of the illustrated interfaces, data structures, elements, processes and/or devices.

Figure 11A:
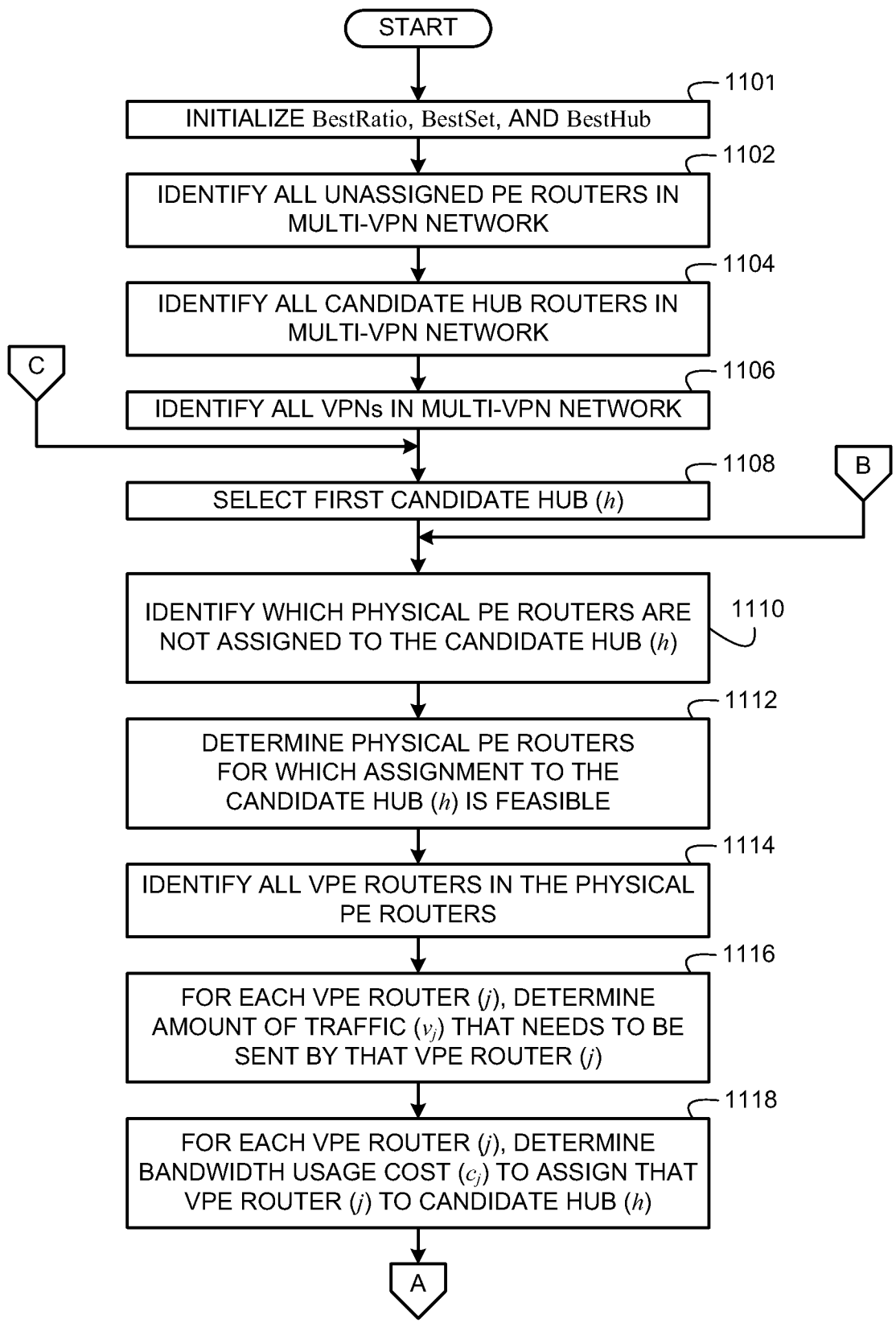
FIGS. 11A and 11B depict a flow diagram representative of a process that can be implemented using computer readable instructions that can be used to select hub routers and assign spoke routers to those selected hub routers.
Figure 11B:
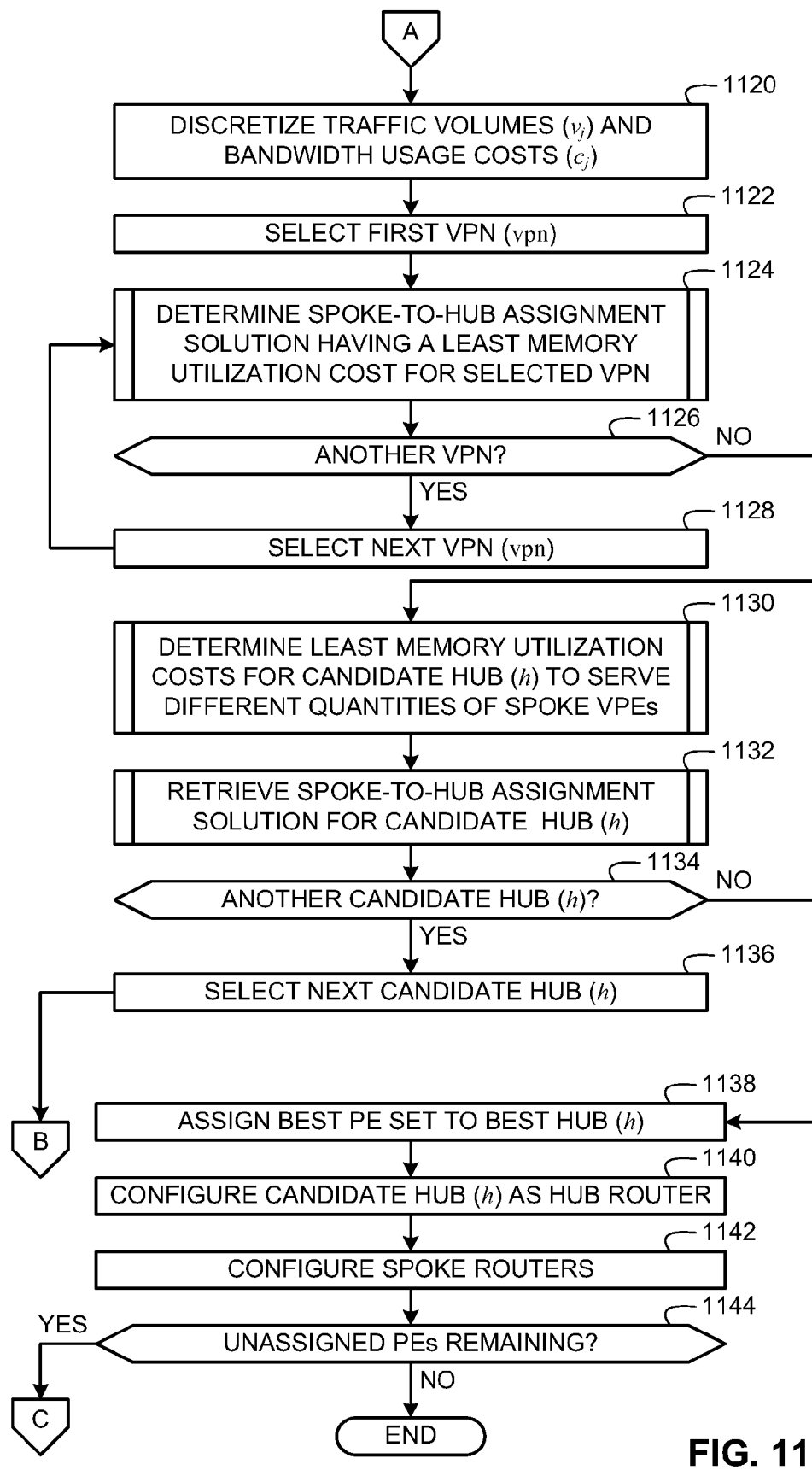

Turning now to FIG. 7, example ComputeAssignment pseudo-code 700 can be used to implement the example process shown in the flow diagram of FIGS. 11A and 11B to select hub routers and assign spoke routers to those selected hub routers. Given any fixed or constant bandwidth cost error factor ($\epsilon > 0$) and bandwidth usage error factor ($\delta > 0$), the ComputeAssignment pseudo-code 700 runs in polynomial time and reports a hub selection and a spoke-to-hub assignment solution having a cost that does not exceed a given optimal cost target or constraint defined by $(1+\epsilon)(1+\ln \rho N)\text{cost}(OPT)$, where ($\rho$) is a constraint value indicative of a minimum number of hubs to which any spoke must be assigned for fault-tolerant reliability, and OPT is the value of the best solution possible, which can be found using a process based on the ComputeAssignment pseudo-code 700.

Figure 12A:
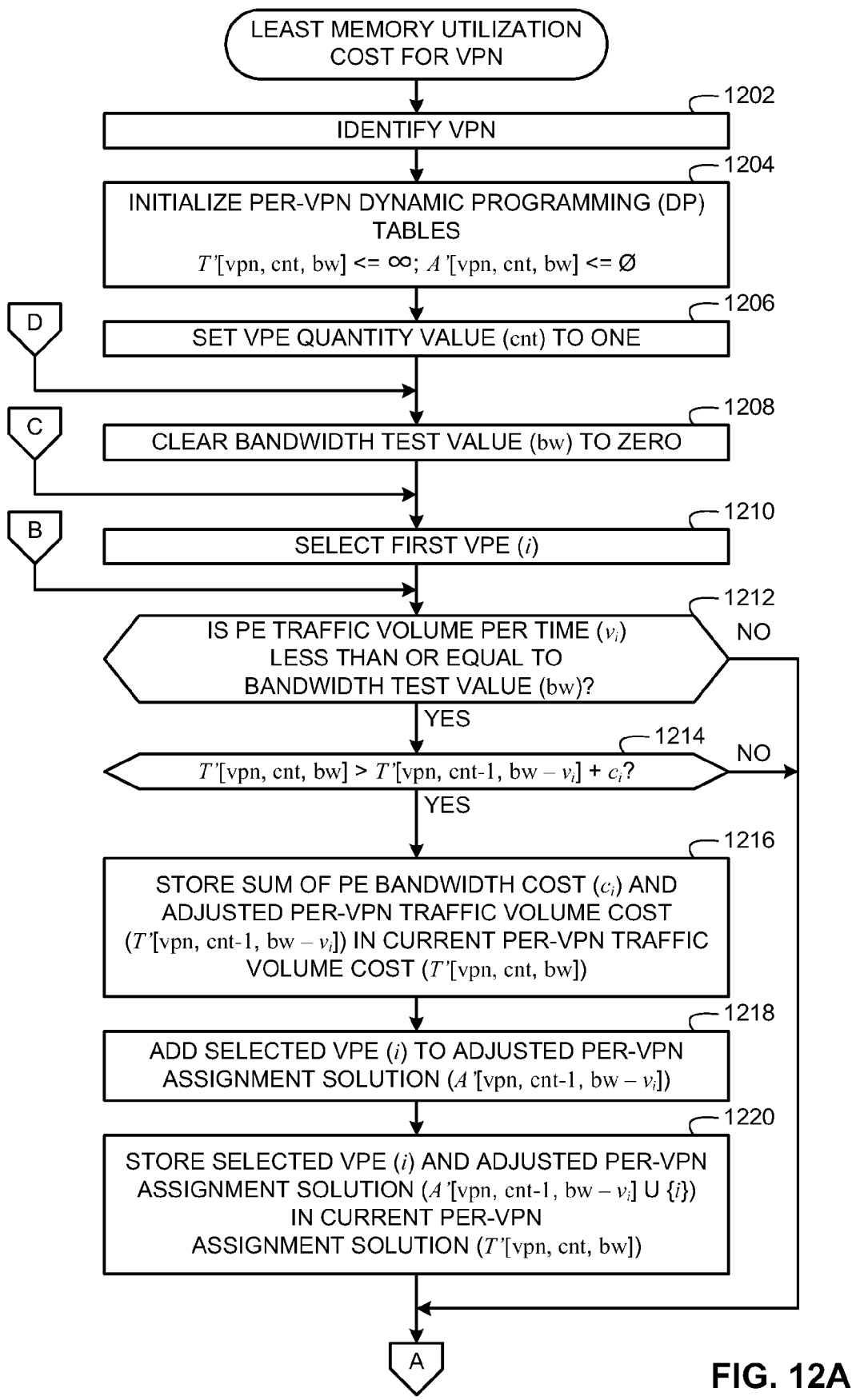
FIGS. 12A and 12B depict a flow diagram representative of a process that can be implemented using computer readable instructions that can be used to determine a spoke-to-hub assignment solution having a least memory utilization cost for a VPN having a particular VPN bandwidth usage.
Figure 12B:
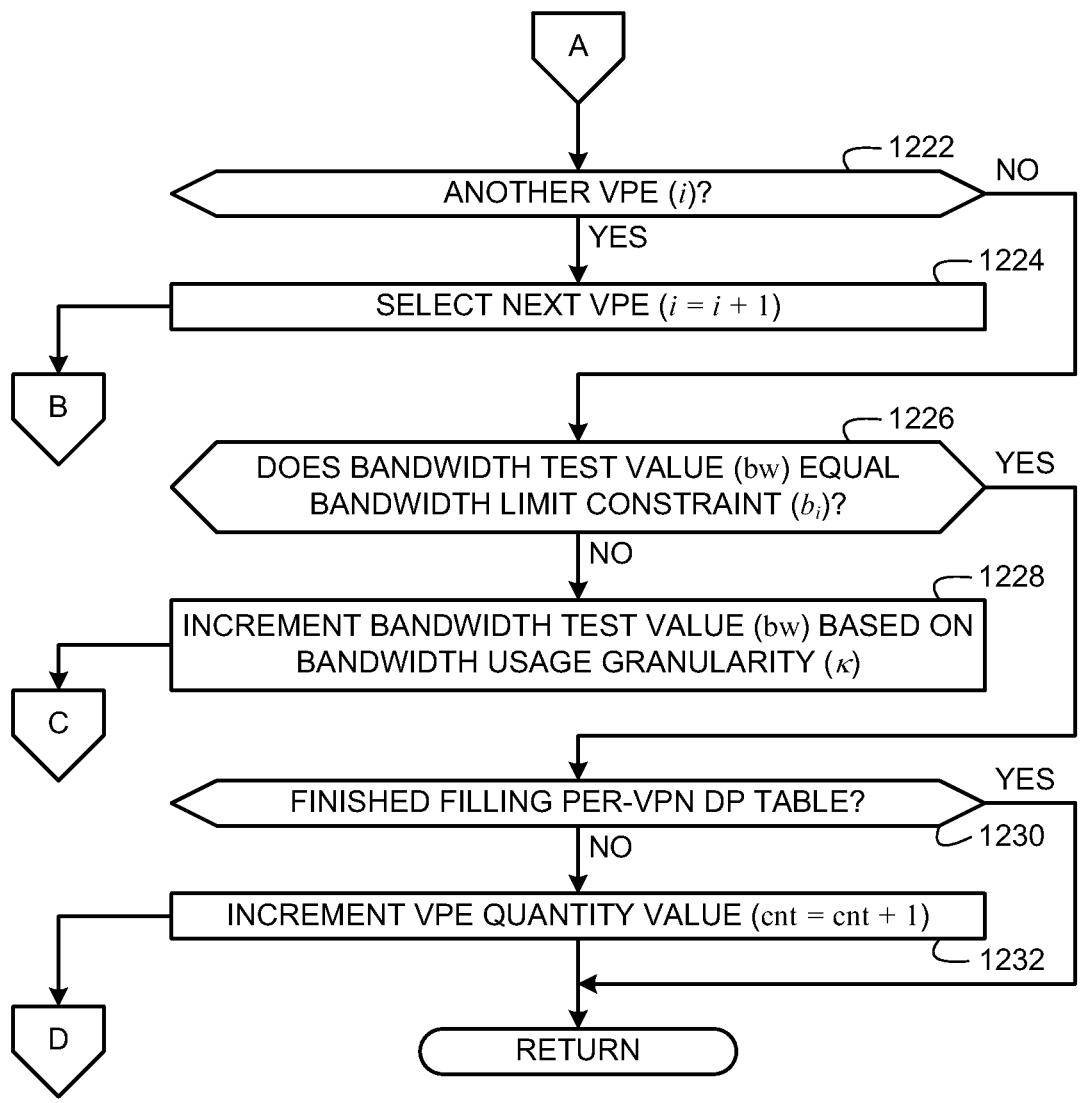

FIG. 8 shows example CostWithCap pseudo-code 800 that can be used to implement the example process shown in the flow diagram of FIGS. 12A and 12B to determine a spoke-to-hub assignment solution having a least memory utilization cost for a VPN having a particular VPN bandwidth usage. In particular, the CostWithCap pseudo-code 800 can be used to compute, in polynomial time, for any VPN (vpn), integer number of VPE routers (count), and VPN bandwidth usage (bdwidth), a spoke-to-hub assignment solution denoted as A'[vpn,count,bwidth] with a cost denoted as T'[vpn,count,bwidth], which is the least cost of satisfying a quantity (count) of VPEs from a given VPN (vpn) having a specified VPN bandwidth usage (bwidth).

Figure 13A:
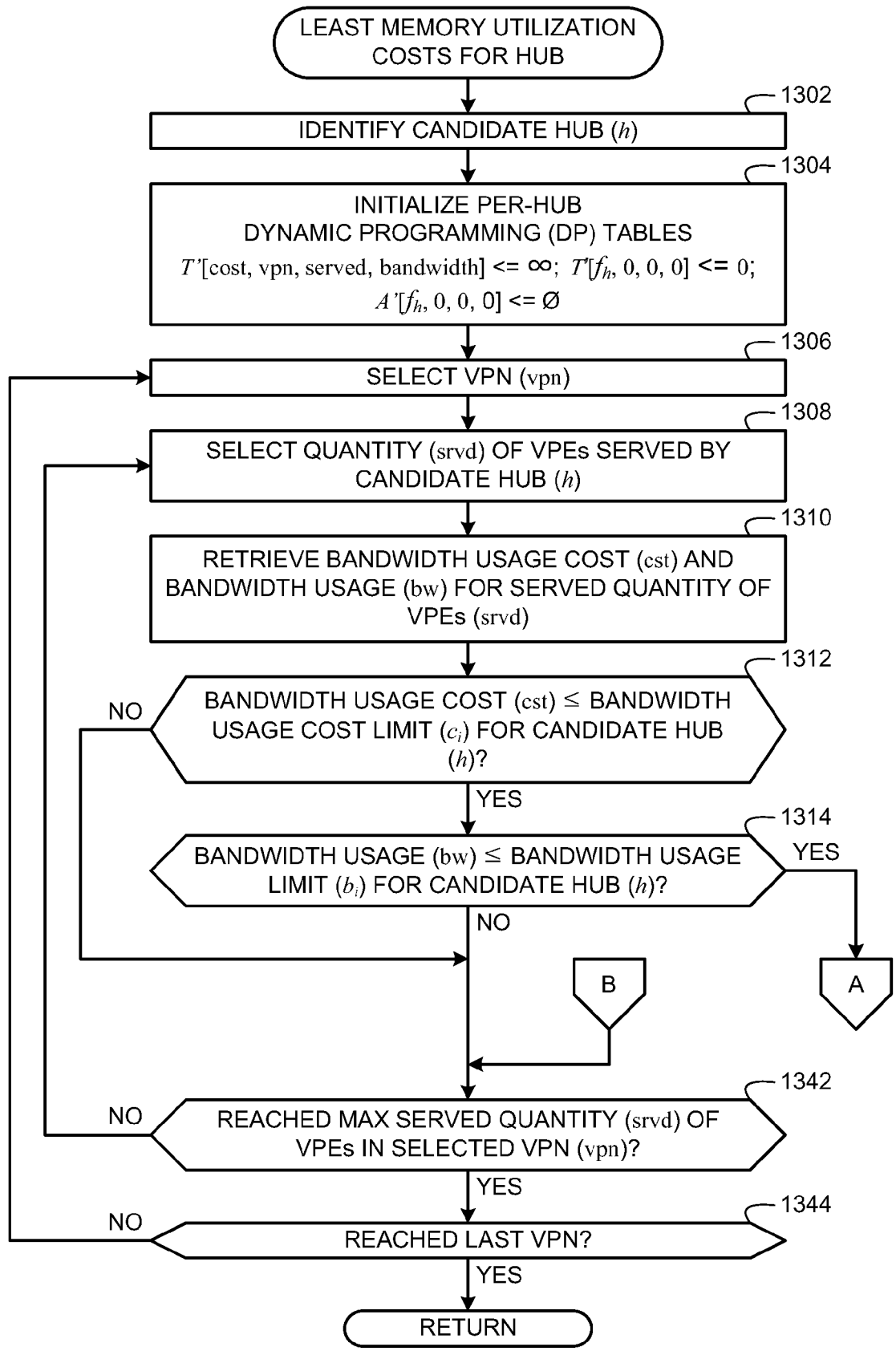
FIGS. 13A and 13B depict a flow diagram representative of a process that can be implemented using computer readable instructions that can be used to determine the cost and associated least memory utilization for a candidate hub to service a quantity of spoke routers while not violating a maximum bandwidth capacity usage constraint of the candidate hub.
Figure 13B:
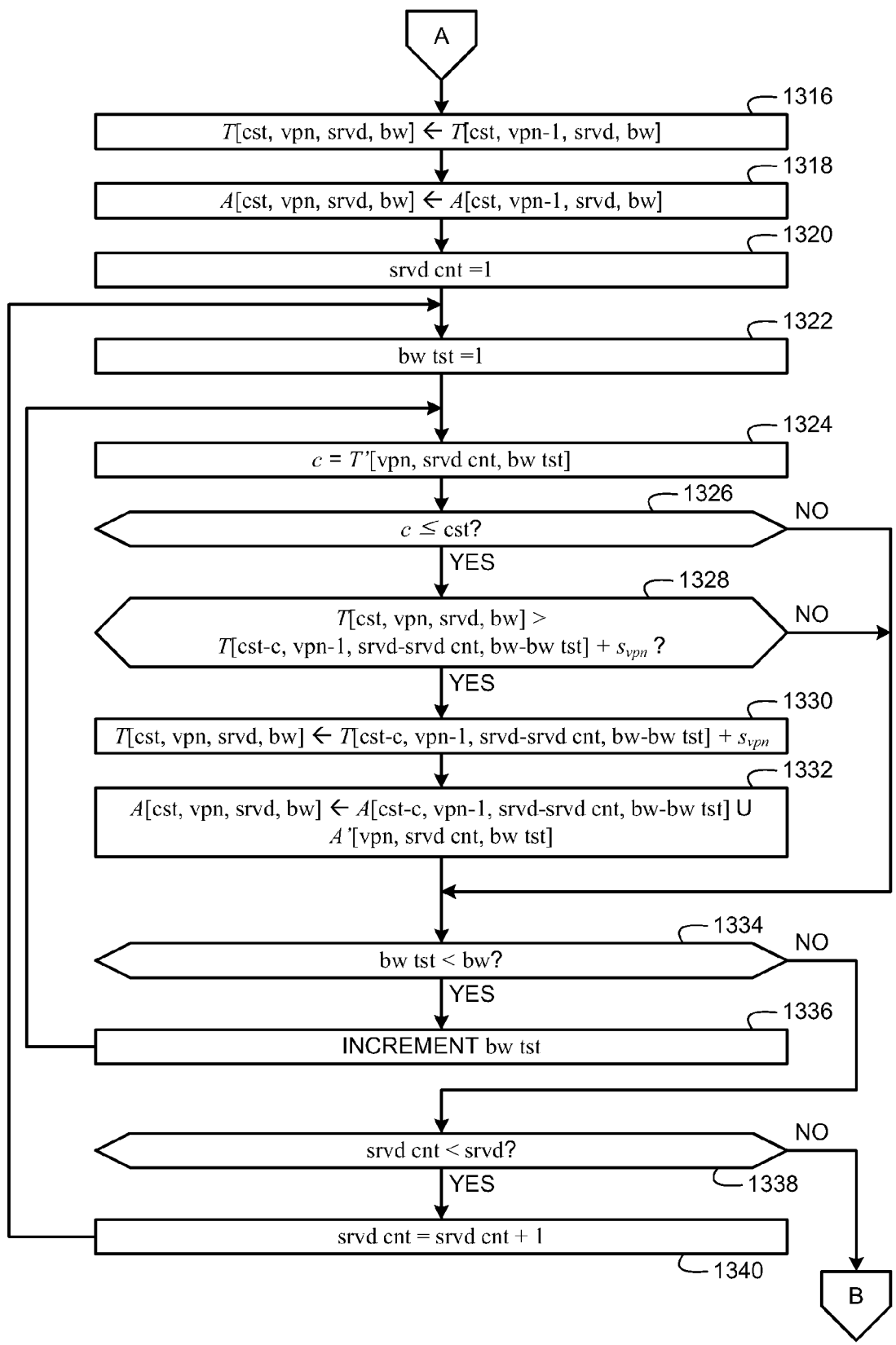

FIG. 9 shows example MainDP pseudo-code 900 that can be used to implement the example process of FIGS. 13A and 13B. In particular, the MainDP pseudo-code 900 can be used to compute, in polynomial time, least memory utilization costs for a candidate hub to service different quantities of spoke routers while not violating a maximum bandwidth capacity usage constraint ($b_i$) for that candidate hub.

Figure 14:
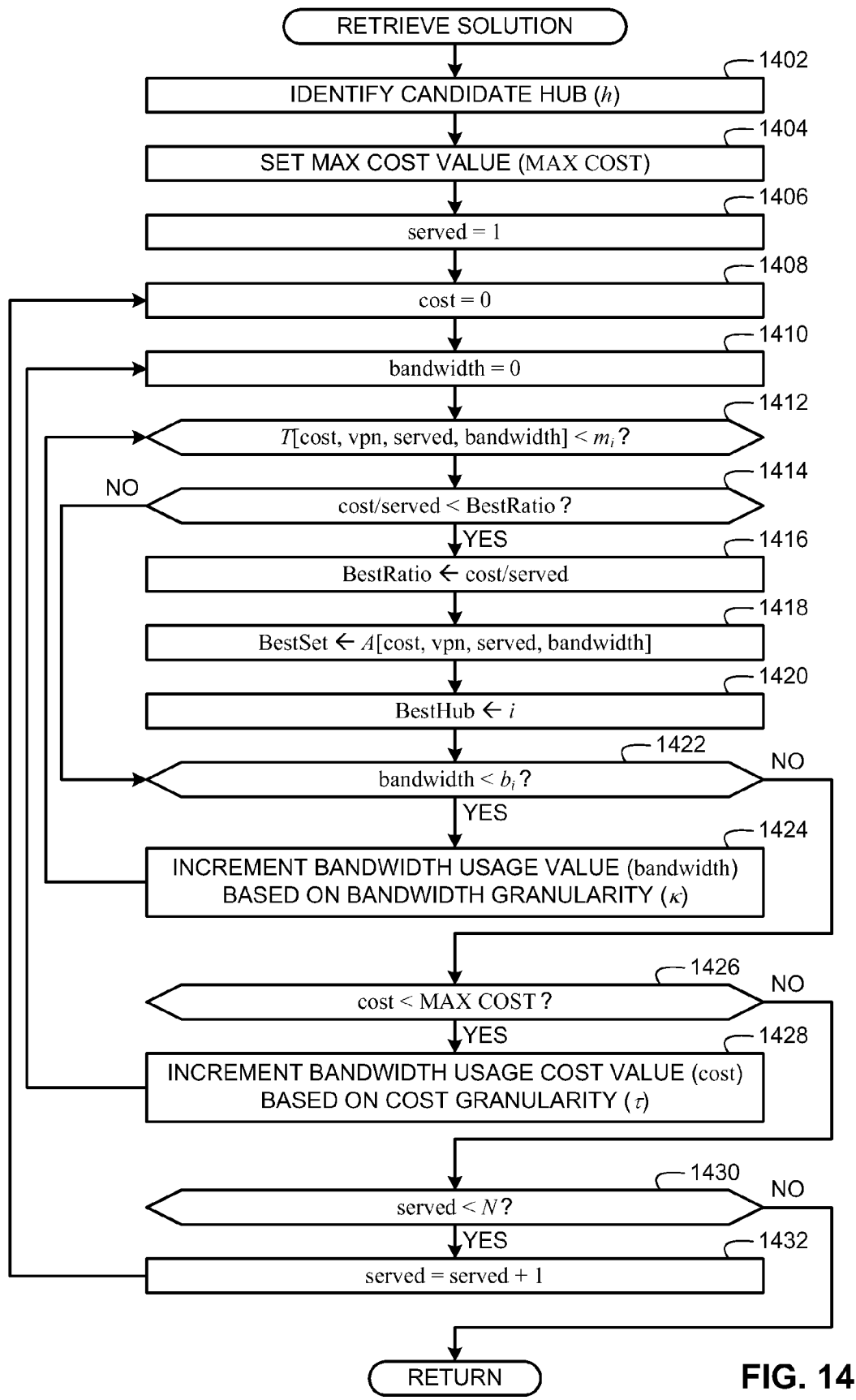
FIG. 14 is a flow diagram representative of a process that can be implemented using computer readable instructions that can be used to select an optimal or near-optimal spoke-to-hub assignment solution for a hub.

FIG. 10 shows example ExtractSolution pseudo-code 1000 that can be used to implement the example process of FIG. 14 to select an optimal or near-optimal hub and spoke-to-hub assignment solution for a hub. The spoke-to-hub assignment solution is based on a least memory utilization and corresponding cost determined using the MainDP pseudo-code 900 of FIG. 9.

Turning now to the example flow diagrams of FIGS. 11A, 11B, 12A, 12B, 13A, 13B, and 14, the depicted processes can be used to select hub routers and create spoke-to-hub assignments. Although the example processes of FIGS. 11A, 11B, 12A, 12B, 13A, 13B, and 14 are described as being implemented using the multi-VPN hub selector 404 of FIGS. 4 and 6, the example operations of FIGS. 11A, 11B, 12A, 12B, 13A, 13B, and 14 may be performed using a processor, a controller and/or any other suitable processing device. For example, the example operations of FIGS. 11A, 11B, 12A, 12B, 13A, 13B, and 14 may be implemented using coded instructions stored on a tangible medium such as a flash memory, a read-only memory (ROM) and/or random-access memory (RAM) associated with a processor (e.g., the processor 1512 of FIG. 15). Alternatively, some or all of the example operations of FIGS. 11A, 11B, 12A, 12B, 13A, 13B, and 14 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example operations of FIGS. 11A, 11B, 12A, 12B, 13A, 13B, and 14 may be implemented manually or as any combination(s) of any of the foregoing techniques, for example, any combination of firmware, software, discrete logic and/or hardware. Further, although the example operations of FIGS. 11A, 11B, 12A, 12B, 13A, 13B, and 14 are described with reference to the flow diagrams of FIGS. 11A, 11B, 12A, 12B, 13A, 13B, and 14, other methods of implementing the operations of FIGS. 11A, 11B, 12A, 12B, 13A, 13B, and 14 may be employed. For example, the order of execution of the blocks may be changed, and/or some of the blocks described may be changed, eliminated, sub-divided, or combined. Additionally, any or all of the example operations of FIGS. 11A, 11B, 12A, 12B, 13A, 13B, and 14 may be performed sequentially and/or in parallel by, for example, separate processing threads, processors, devices, discrete logic, circuits, etc.

Turning to FIGS. 11A and 11B, the depicted flow diagram is representative of computer readable instructions that can be used to select hub routers and assign spoke routers to those selected hub routers. Initially, the hub selection module 604 initializes solution variables BestRatio, BestSet, and BestHub (block 1101), in which optimal or near-optimal hub selection and spoke-to-hub assignment solutions can be stored. In the illustrated example, the solution variable BestRatio is used to store the best (i.e., lowest) ratio of bandwidth usage cost-to-quantity of VPEs served (i.e., cost/quantity-served). The solution variable BestSet is used to store a set of VPE identifiers for VPE routers having been identified as part of an optimal or near-optimal spoke-to-hub assignment solution based on the value in the BestRatio variable. The solution variable BestHub is used to store a physical PE router identifier of a PE router having been identified, based on the BestRatio value, as the best router to serve as a hub for the set of VPEs identified by the BestSet variable. To initialize the solution variables, the hub selection module 604 sets the BestRatio variable equal to a relatively high number (denoted as infinity ($\infty$) in mathematical notation), sets the BestSet solution variable to an empty set ($\emptyset$) meaning that a spoke-to-hub assignment solution does not yet exist, and sets the BestHub to zero meaning that a hub has not yet been found.

The hub selection module 604 identifies all of the unassigned PE routers (e.g., PE routers PE1-PE5 of FIG. 4) in the MPLS-based multi-VPN network 400 (block 1102). In the illustrated example, an unassigned PE router is one that has not yet been assigned to a hub router. (As discussed above, when a VPN is installed in a physical PE router, the logical portion of that PE router serving that installed VPN is referred to as a VPE router. Therefore, if a PE router in which a VPN is installed is not yet assigned as a spoke to a particular hub PE router, the VPE in that PE router corresponding to the VPN is not yet assigned as a spoke router to any hub PE router.) The hub selection module 604 identifies all of the candidate hub routers in the MPLS-based multi-VPN network 400 (block 1104). In the illustrated example, the candidate hub routers may be all or a portion of all the physical PE routers PE1-PE5 of FIG. 4, some of which may not yet be designated as hubs and some of which may already be operating as hubs for some PEs. The hub selection module 604 identifies all the VPNs (e.g., VPN1-VPN4 of FIG. 4) in the MPLS-based multi-VPN network 400 (block 1106).

The hub selection module 604 selects a first candidate hub router (h) (block 1108) from the candidate hub routers identified at block 1104. The hub selection module 604 identifies which physical PE routers (of those identified at block 1102) are not assigned to the selected candidate hub router (h) (block 1110). The hub selection module 604 then determines for which of the physical PE routers not assigned as a spoke router to the selected candidate hub (h) it would be feasible to make such an assignment (block 1112). For example, the hub selection module 604 can determine that it would be feasible to assign a particular physical PE router as a spoke router (sp) to the selected candidate hub (h) if the transmission latency of relaying the traffic generated at the physical PE router through the selected candidate hub (h) is less than a maximum latency threshold ($\theta$). In the illustrated example, such a spoke-to-hub assignment is feasible if the distance between the physical PE router (sp) and the candidate hub (h) (i.e., d(sp, h)) plus the distance between the candidate hub (h) and a destination PE router (dst) (i.e., d(h,dst)) minus the distance directly between the physical PE router (sp) and the destination PE router (dst) (i.e., d(sp,dst)) is less than or equal to the maximum latency threshold ($\theta$) (i.e., feasibility=true if d(sp, h)+d(h,dst)−d(sp,dst)≤$\theta$).

For the physical PE routers identified at block 1112, the hub selection module 604 identifies all VPE routers in those physical PE routers (block 1114). For each VPE router (j), the hub selection module 604 determines the amount of traffic volume per time ($v_j$) that needs to be sent by that VPE router (j) (block 1116). For example, the hub selection module 604 can retrieve traffic volume data from the traffic data collector 602 (FIG. 6) that identifies individual traffic volumes per time ($v_j$) for each VPE router (j) corresponding to data communicated during particular durations (i.e., VPE bandwidth usage). For each VPE router (j), the hub selection module 604 also determines the bandwidth usage cost ($c_j$) that would be incurred to assign that VPE router (j) to the candidate hub (h) (block 1118). For example, the hub selection module 604 can retrieve a bandwidth cost rate (e.g., Mbps unit cost) from the costs database 608 to determine the bandwidth usage cost ($c_j$) based on the cost rate and the traffic volumes per time ($v_j$).

As shown in FIG. 11B, the hub selection module 604 discretizes the traffic volumes per time ($v_j$) and the bandwidth usage costs ($c_j$) (block 1120) for all of the VPE routers (j). In the illustrated example, the hub selection module 604 discretizes the traffic volumes per time ($v_j$) using the bandwidth usage granularity ($\kappa$) and with respect to the bandwidth usage error factor ($\delta$). Also, the hub selection module 604 discretizes the bandwidth usage costs ($c_j$) using the bandwidth cost granularity ($\tau$) and with respect to the bandwidth cost error factor ($\tau$). In this manner, the cost model of equation 2 above can be analyzed at different incremental quantities (incremented based on granularities ($\kappa$) and ($\tau$)) of traffic volumes per time ($v_j$) and bandwidth usage costs ($c_j$) as discussed further below to select hubs and spoke-to-hub assignment solutions.

The hub selection module 604 selects a first one of the VPNs (e.g., VPN1-VPN4 of FIG. 4) (block 1122). The hub selection module 604 determines a spoke-to-hub assignment solution having a least memory utilization cost for the selected VPN having a particular VPN bandwidth usage (block 1124). An example process that can be used to implement the operation of block 1124 is discussed below in connection with FIGS. 12A and 12B. The minimum cost determined at block 1124 is associated with assigning a particular quantity of VPEs serving a particular VPN as spoke routers to the candidate hub (h) as determined using the example process of FIGS. 12A and 12B. After determining the minimum cost for the selected VPN (block 1124), the hub selection module 604 determines whether there is another VPN remaining (block 1126) for which to determine a spoke-to-hub assignment solution having a least memory utilization cost. If another VPN remains, the hub selection module 604 selects another VPN (block 1128) and control returns to block 1124. In this manner, in the illustrated example, the operation of block 1124 is performed for each VPN identified at block 1106 above to populate per-VPN dynamic programming (DP) tables with the minimum memory utilization costs and corresponding spoke-to-hub assignment solutions associated with the candidate hub (h) for each VPN.

If minimum costs have been determined for all VPNs (block 1126), control advances to block 1130 at which the hub selection module 604 determines the least memory utilization costs that can be achieved for the candidate hub (h) to serve different quantities of spoke routers without violating a maximum bandwidth capacity constraint ($b_i$) for the candidate hub (h) (block 1130). An example process that can be used to implement the operation of block 1130 is discussed below in connection with the flow diagram of FIGS. 13A and 13B. The operation of block 1130 uses the least memory utilization costs and spoke-to-hub assignment solutions from the per-VPN DP tables generated at block 1124 to determine costs, memory utilization values, and corresponding spoke-to-hub assignment solutions associated with the candidate hub (h) serving different quantities of spoke routers for each VPN identified at block 1106 above. That is, for each VPN, the hub selection module 604 determines the cost associated with a least memory utilization required for the candidate hub (h) to serve a corresponding quantity of spoke VPE routers corresponding to that VPN.

The hub selection module 604 then retrieves an optimal or near-optimal spoke-to-hub assignment solution based on the per-hub DP tables for the candidate hub (h) (block 1132). In the illustrated example, an optimal or near-optimal spoke-to-hub assignment solution is one that has the smallest ratio of cost-to-quantity of spoke VPEs that can be assigned to the candidate hub router (h). In this manner, the selected candidate hub (h) can store a full VRF table having all of the routes corresponding to the VPN installed in the VPEs assigned to the candidate hub (h). An example process that can be used to implement the operation of block 1132 is discussed below in connection with the flow diagram of FIG. 14.

The hub selection module 604 then determines whether there is another candidate hub router remaining to be analyzed (block 1134). If another candidate hub router remains (block 1134), the hub selection module 604 selects another candidate hub router (h) (block 1136) and control returns to block 1110 of FIG. 11A. Otherwise, if no other candidate hub routers remain to be analyzed (block 1134), the best set (BestSet) of PE identifiers is assigned to the best hub (BestHub)

(block 1138). That is, a VPE set (i.e., a grouping of VPEs) associated with the best ratio (i.e., lowest ratio) of bandwidth usage cost-to-quantity of spoke routers served by the candidate hub (h) is assigned to that candidate hub (h). In this manner, the candidate hub (h) can be configured to operate as a hub (block 1140) by storing a full VRF table, and the VPEs corresponding to that VPE set for a particular VPN can be configured to operate as spokes assigned to the candidate hub (h) (block 1142).

If unassigned PEs still remain (block 1144), control returns to block 1108 (FIG. 11A). In this manner, the process of FIGS. 11A and 11B can be repeated until all PEs have been assigned to a hub router. When no unassigned PEs remain, the example process of FIGS. 11A and 11B ends.

FIGS. 12A and 12B depict a flow diagram representative of computer readable instructions that can be used to determine a spoke-to-hub assignment solution having a least memory utilization cost for a VPN having a particular VPN bandwidth usage. The example process of FIGS. 12A and 12B can be used to implement the operation of block 1124 of FIG. 11B. Initially, the hub selection module 604 identifies a VPN (vpn) (block 1202) for which to determine the spoke-to-hub assignment solution. For example, a VPN identifier can be provided to the example process of FIGS. 12A and 12B from a calling function or process such as the example process of FIGS. 11A and 11B. The hub selection module 604 initializes per-VPN dynamic programming (DP) tables (block 1204). In the illustrated example, a per-VPN DP table represented by the notation (T') is a per-VPN cost table, in which each table cell addressed by (T'[vpn, cnt, bw]) stores a per-VPN memory utilization cost corresponding to a quantity of VPE routers (cnt) in which a particular VPN (vpn) (e.g., the VPN identified at block 1202) is installed and that collectively use a particular bandwidth usage (bw) (referred to as a bandwidth usage test value (bw) below in connection with the example process of FIGS. 12A and 12B) to serve that VPN (vpn). (As discussed above, when a VPN is installed in a physical PE router, the logical portion of that PE router serving that installed VPN is referred to as a VPE. Therefore, if a VPE in a PE router corresponding to a VPN is assigned as a spoke router to a particular hub PE router, the PE router in which the VPN is installed is assigned as a spoke to that hub PE router.) Another per-VPN DP table represented by the notation (A') is a per-VPN spoke-to-hub assignment solution table, in which each table cell stores a particular assignment solution and is addressed by (A'[vpn, cnt, bw]). Each per-VPN memory utilization cost value (T'[vpn, cnt, bw]) corresponds to a particular per-VPN spoke-to-hub assignment solution (A'[vpn, cnt, bw]). To initialize the per-VPN DP tables at block 1204, all values in the memory utilization cost cells (T'[vpn, cnt, bw]) are set to a relatively high number (denoted as infinity ($\infty$) in mathematical notation) meaning that a least memory utilization cost is yet to be found. In addition, the hub selection module 604 sets a first one of the memory utilization cost cells addressed by (T'[vpn, 0, 0]) to zero and sets a first one of the spoke-to-hub assignment solution cells addressed by (A'[vpn, 0, 0]) to an empty set ($\emptyset$) meaning that a solution does not yet exist.

The hub selection module 604 sets the VPE quantity value (cnt) to one (i.e., cnt=1) (block 1206) and clears the bandwidth usage test value (bw) to zero (i.e., bw=0) (block 1208). The hub selection module 604 then selects a first VPE (i) (block 1210) from a plurality of (n) VPEs of the VPN (vpn). The hub selection module 604 then determines whether the VPE traffic volume per time ($v_i$) (i.e., VPE bandwidth usage) of the selected PE (i) is less than or equal to the bandwidth usage test value (bw) (i.e., $v_i \le bw$) (block 1212). In this manner, the hub selection module 604 can determine whether the currently selected VPE (i) can be a spoke router of a spoke-to-hub assignment solution without exceeding the bandwidth usage test value (bw).

If the VPE traffic volume per time ($v_i$) of the selected VPE (i) is less than or equal to the bandwidth usage test value (bw) (block 1212), the hub selection module 604 determines whether the per-VPN memory utilization cost value (T'[vpn, cnt, bw]) for the VPN (vpn), VPE quantity value (cnt), and bandwidth usage test value (bw) is greater than the sum of a VPE bandwidth usage cost ($c_i$) and an adjusted per-VPN memory utilization cost value (T'[vpn, cnt−1, bw−$v_i$]) (i.e., T'[vpn, cnt, bw]>T'[vpn, cnt−1, bw−$v_i$]+$c_i$) (block 1214). In the illustrated example, the adjusted per-VPN memory utilization cost value (T'[vpn, cnt−1, bw−$v_i$]) corresponds to a VPE quantity value (cnt) decremented by one PE (i.e., cnt−1) and a bandwidth usage test value (bw) from which the VPE traffic volume per time ($v_i$) is subtracted.

If the sum of the PE bandwidth cost ($c_i$) and the adjusted per-VPN memory utilization cost value (T'[vpn, cnt−1, bw−$v_i$]) (i.e., T'[vpn, cnt−1, bw−$v_i$]+$c_i$) is greater than the per-VPN memory utilization cost value (T'[vpn, cnt, bw]) (block 1214), the hub selection module 604 stores the sum of a VPE bandwidth usage cost ($c_i$) and the adjusted per-VPN memory utilization cost value (T'[vpn, cnt−1, bw−$v_i$]) in the per-VPN memory utilization cost cell (T'[vpn, cnt, bw]) (i.e., T'[vpn, cnt, bw]←T'[vpn, cnt−1, bw−$v_i$]+$c_i$) (block 1216). The hub selection module 604 adds the selected VPE (i) to an adjusted per-VPN spoke-to-hub assignment solution (A'[vpn, cnt−1, bw−$v_i$]) (i.e., A'[vpn, cnt−1, bw−$v_i$]∪{i}) (block 1218) and stores the selected VPE (i) and adjusted per-VPN assignment solution (A'[vpn, cnt−1, bw−$v_i$]) (i.e., A'[vpn, cnt−1, bw−$v_i$]∪{i}) in the per-VPN memory utilization cost value (T'[vpn, cnt, bw]) (block 1220).

After the operation of block 1220 or if the hub selection module 604 determines at block 1214 that the sum of the VPE bandwidth usage cost ($c_i$) and the adjusted per-VPN memory utilization cost value (T'[vpn, cnt−1, bw−$v_i$]) (i.e., T'[vpn, cnt−1, bw−$v_i$]+$c_i$) is not greater than the per-VPN memory utilization cost value (T'[vpn, cnt, bw]) or if the hub selection module 604 determines at block 1212 that the VPE traffic volume per time ($v_i$) of the selected PE (i) is not less than or equal to the bandwidth usage test value (bw), then control advances to block 1222 shown in FIG. 12B.

Turning to FIG. 12B, the hub selection module 604 determines whether there is another VPE (i) (block 1222) of the plurality of (n) VPEs of the VPN (vpn) is installed for which to test whether a least memory utilization cost exists. If there is another VPE (i), the hub selection module 604 selects a next VPE (i) (i.e., i=i+1) (block 1224) and control returns to block 1212 of FIG. 12A. Otherwise, if the hub selection module 604 determines that there is not another VPE (i) of the plurality of (n) VPEs for which to analyze cost (block 1222), control advances to block 1226 at which the hub selection module 604 determines whether the bandwidth usage test value (bw) is equal to a bandwidth usage capacity constraint ($b_i$) for the selected VPE (i) (i.e., bw=$b_i$) (block 1226). If the bandwidth usage test value (bw) is not equal to the bandwidth capacity constraint ($b_i$) (block 1226), the hub selection module 604 increments the bandwidth usage test value (bw) to a next incremental value based on the bandwidth usage granularity (K) (block 1228) and control returns to block 1210 of FIG. 12A.

If the bandwidth usage test value (bw) is equal to the bandwidth capacity constraint ($b_i$) (block 1226), control advances to block 1230 at which the hub selection module 604 determines whether it has finished filling the per-VPN DP table. In the illustrated example, the per-VPN DP table is filled when the VPE quantity value (cnt) equals the quantity of the plurality of (n) VPEs of the VPN (vpn) (i.e., cnt=n). If the per-VPN DP table is not yet filled (block 1230), the hub selection module 604 increments the VPE quantity value (cnt) (i.e., cnt=cnt+1) (block 1232) and control returns to block 1208 of FIG. 12A. Otherwise, if the per-VPN DP table is filled (block 1230), the example process of FIGS. 12A and 12B ends and control returns to a calling function or process such as the example process of FIGS. 11A and 11B.

FIGS. 13A and 13B depict a flow diagram representative of computer readable instructions that can be used to determine least memory utilization costs for each candidate hub (h) to serve different quantities of spoke routers without violating the maximum bandwidth capacities ($b_i$) of that hub (h). The example process of FIGS. 13A and 13B can be used to implement the example operation of block 1130 of FIG. 11B. Initially, the hub selection module 604 identifies a candidate hub (h) (block 1302). For instance, the candidate hub (h) can be provided to the example process of FIGS. 13A and 13B from a calling function or process such as the example process of FIGS. 11A and 11B. The hub selection module 604 initializes a per-hub DP table (block 1304). In the illustrated example, a per-hub DP table represented by the notation (T) is a per-hub memory utilization for a particular spoke-to-hub assignment solution represented by the notation (A). A per-hub memory utilization table cell is addressed by (T[cost, vpn, served, bandwidth]) and stores a per-hub memory utilization corresponding to a spoke-to-hub assignment solution (A) to serve a quantity of served spoke routers (served) from one or more VPNs (vpn) and having a particular memory utilization cost (cost) and bandwidth usage (bandwidth). (As discussed above, when a VPN is installed in a physical PE router, the logical portion of that PE router serving that installed VPN is referred to as a VPE. Therefore, if a VPE in a PE router corresponding to a VPN is assigned as a spoke router to particular hub PE router, the PE router in which the VPN is installed is assigned as a spoke to that hub PE router.)

In a per-hub spoke-to-hub assignment solution table (A), each table cell stores a particular assignment solution and is addressed by (A[cost, vpn, served, bandwidth]). Each per-hub memory utilization value (T [cost, vpn, served, bandwidth]) corresponds to a particular per-hub spoke-to-hub assignment solution (A[cost, vpn, served, bandwidth]). To initialize the per-hub DP tables at block 1304, the memory utilization cells (T[cost, vpn, served, bandwidth]) are set to a relatively high number (denoted as infinity (∞) in mathematical notation) meaning that a least memory utilization is yet to be found. In addition, the hub selection module 604 sets a first one of the memory utilization cells addressed by (T [$f_h$, 0, 0, 0]) to zero (where ($f_h$) is the cost of deploying and maintaining the candidate hub (h)) and sets a first one of the spoke-to-hub assignment solution cells addressed by (A[$f_h$, 0, 0, 0]) to an empty set (|) meaning that a solution does not yet exist.

The hub selection module 604 selects a VPN (vpn) (block 1306) from, for example, the plurality of VPNs identified at block 1106 of FIG. 11. The hub selection module 604 selects a quantity (srvd) of VPEs served by the candidate hub (h) (block 1308) and retrieves the bandwidth usage cost (cst) and the bandwidth usage (bw) for the served quantity (srvd) of VPEs (block 1310). The hub selection module 604 then determines if the bandwidth usage cost (cst) is less than or equal to a bandwidth usage cost limit ($c_i$) for the candidate hub (h) (block 1312) and if the bandwidth usage (bw) is less than or equal to the bandwidth usage limit ($b_i$) for the candidate hub (h) (block 1314). In this manner, the hub selection module 604 can determine whether the currently selected served quantity (srvd) of PEs can constitute a feasible spoke-to-hub assignment solution for the candidate hub (h).

If the hub selection module 604 determines that the bandwidth usage cost (cst) is less than or equal to a bandwidth usage cost limit ($c_i$) for the candidate hub (h) (block 1312) and that the bandwidth usage (bw) is less than or equal to the bandwidth usage limit ($b_i$) for the candidate hub (h) (block 1314), control advances to block 1316 shown in FIG. 13B. The hub selection module 604 stores a memory utilization value for a previous VPN (T[cost, vpn−1, served, bandwidth]) in the current VPN memory utilization value (T[cost, vpn, served, bandwidth]) (i.e., T[cost, vpn, served, bandwidth]←T[cost, vpn−1, served, bandwidth]) (block 1316) and stores a spoke-to-hub assignment solution for a previous VPN (A[cost, vpn−1, served, bandwidth]) in the current VPN spoke-to-hub assignment solution (A[cost, vpn, served, bandwidth]) (i.e., A[cost, vpn, served, bandwidth]←A[cost, vpn−1, served, bandwidth]) (block 1318).

The hub selection module 604 then initializes and sets a served count variable (srvd cnt) equal to one (i.e., srvd cnt=1) (block 1320), a bandwidth usage test variable (bw tst) equal to one (i.e., bw tst=1) (block 1322), and a cost test variable (c) equal to a memory utilization cost value stored in a cell addressed by (T'[vpn, srvd cnt, bw tst]) (block 1324) within the memory utilization cost DP table (T') generated in the example process of FIGS. 12A and 12B. The hub selection module 604 then determines whether the cost test value (c) is less than or equal to the bandwidth usage cost (cst) (block 1326) retrieved at block 1310. The hub selection module 604 also determines whether the VPN memory utilization value (T[cst, vpn, srvd, bw]) is greater than the sum of a VPN memory utilization requirement ($s_{vpn}$) and an adjusted VPN memory utilization value (T[cst−c, vpn−1, srvd−srvd cnt, bw−bw tst]) (i.e., T[cst−c, vpn−1, srvd−srvd cnt, bw−bw tst]+$s_{vpn}$) (block 1328). In the illustrated example, the VPN memory utilization requirement ($s_{vpn}$) is the memory capacity or footprint required to by a full VRF table in a PE router to store all the routes required to communicate traffic for a particular VPN. Also in the illustrated example, the adjusted VPN memory utilization value (T[cst−c, vpn−1, srvd−srvd cnt, bw−bw tst]) corresponds to a previous VPN (vpn−1), a bandwidth usage cost (cst) from which the cost test value (c) is subtracted, a quantity (srvd) of VPEs from which the served count value (srvd cnt) is subtracted, and a bandwidth usage (bw) from which the bandwidth usage test value (bw tst) is subtracted.

If the tests of blocks 1326 and 1328 are both true, the hub selection module 604 stores the sum of a VPN memory utilization requirement ($s_{vpn}$) and an adjusted VPN memory utilization value (T[cst−c, vpn−1, srvd−srvd cnt, bw−bw tst]) (i.e., T[cst−c, vpn−1, srvd−srvd cnt, bw−bw tst]+$s_{vpn}$) in the memory utilization cell addressed by (T[cst, vpn, srvd, bw]) (block 1330). In addition, the hub selection module 604 adds the spoke-to-hub assignment solution addressed by (A'[vpn, srvd cnt, bw tst]) in the per-VPN spoke-to-hub assignment DP table (A') generated using the example process of FIGS. 13A and 13B to the adjusted assignment solution (A[cst−c, vpn−1, srvd−srvd cnt, bw−bw tst]) and stores the resulting spoke-to-hub assignment solution (i.e., A[cst−c, vpn−1, srvd−srvd cnt, bw−bw tst]∪A'[vpn, srvd cnt, bw tst]) in the current VPN spoke-to-hub assignment solution (A[cst, vpn, srvd, bw]) (block 1332).

After block 1332 or if one or both of the tests of block 1326 and 1328 are not true, control advances to block 1334 at which the hub selection module 604 determines whether the bandwidth usage test value (bw tst) is less than the bandwidth usage (bw) retrieved at block 1310 (block 1334). If the bandwidth usage test value (bw tst) is less than the bandwidth usage (bw) (block 1334), the hub selection module 604 increments the bandwidth usage value (bw) to the next incremental value based on the bandwidth usage granularity (K) (block 1336) and control returns to block 1324. Otherwise, if the bandwidth usage test value (bw tst) is not less than the bandwidth usage (bw) (block 1334), the hub selection module 604 determines whether the served count value (srvd cnt) is less than the quantity (srvd) of VPEs served by the candidate hub (h) as selected at block 1308 (block 1338). If the served count value (srvd cnt) is less than the served quantity (srvd) of VPEs (block 1338), the hub selection module 604 increments the served count value (srvd cnt) (i.e., srvd cnt=srvd cnt+1) (block 1340) and control returns to block 1322. Otherwise, if the served count value (srvd cnt) is not less than the served quantity (srvd) of VPEs (block 1338), control returns to block 1342. In the illustrated example, control is also advanced to block 1342 if the tests o blocks 1312 and 1314 discussed above are not true.

The hub selection module 604 determines whether the maximum served quantity (srvd) of VPEs in the selected VPN (vpn) has been reached (block 1342). If the maximum served quantity (srvd) of VPEs has not been reached, control returns to block 1308 at which another served quantity (srvd) of VPEs is selected. Otherwise, the hub selection module 604 determines whether the last VPN of the VPNs identified at block 1106 of FIG. 11A has been reached (block 1344). If the last VPN has not been reached, control returns to block 1306 at which another VPN is selected. Otherwise, if the last VPN has been reached, the example process of FIGS. 13A and 13B is ended and control returns to a calling function or process such as the example process of FIGS. 11A and 11B.

FIG. 14 is a flow diagram representative of computer readable instructions that can be used to select an optimal or near-optimal spoke-to-hub assignment solution for a candidate hub (h). Initially, the hub selection module 604 identifies a candidate hub (h) (block 1402). For instance, the candidate hub (h) can be provided to the example process of FIG. 14 from a calling function or process such as the example process of FIGS. 11A and 11B. The hub selection module 604 then sets a maximum cost value (MAX COST) (block 1404). In the illustrated example, the maximum cost value (MAX COST) is set to equal the sum of the cost of deploying and maintaining ($f_h$) the candidate hub (h) plus the minimum usage cost ($c_j$) of each VPE (j) within the set of unsatisfied (i.e., unassigned) PE routers identified at block 1110 of FIG. 11A (i.e., MAX COST←$\min_{j \in S} c_j$).

The hub selection module 604 then initializes and sets a served quantity (served) of VPE routers to one (i.e., served=1) (block 1406), a bandwidth usage cost (cost) to zero (i.e., cost=0) (block 1408), and a bandwidth usage value (bandwidth) to zero (i.e., bandwidth=0) (block 1410). The hub selection module 604 then determines whether a memory utilization (T[cost, vpn, served, bandwidth]) is less than a memory capacity ($m_i$) of the full VRF table size of the candidate hub (h) (block 1412). If the memory utilization (T[cost, vpn, served, bandwidth]) is less than a memory capacity ($m_i$), the hub selection module 604 determines whether a ratio of the bandwidth usage cost (cost)-to-quantity of PE routers served (served) (i.e., cost/quantity-served) is less than a previously determined best ratio (i.e., a ratio value previously stored in the BestRatio solution variable initialized at block 1101 of FIG. 11A) (block 1414). If the cost-to-quantity ratio (cost/quantity-served) is less than a previously determined best ratio (BestRatio), the hub selection module 604 updates the solution variables BestRatio, BestSet, and BestHub previously initialized at block 1101 of FIG. 11A. In particular, the cost-to-served ratio (cost/quantity-served) is stored in the BestRatio solution variable (block 1416), the per-hub spoke-to-hub solution assignment determined in connection with the example process of FIGS. 13A and 13B and addressed by (A[cost, vpn, served, bandwidth]) is stored in the BestSet solution variable (block 1418), and the candidate hub identifier (i) is stored in the BestHub solution variable (block 1420).

After updating the solution variables BestRatio, BestSet, and BestHub at blocks 1414, 1416, and 1418 or if the cost-to-quantity ratio (cost/quantity-served) is not less than a previously determined best ratio (BestRatio) (block 1414), the hub selection module 604 determines whether the bandwidth usage value (bandwidth) is less than the bandwidth usage capacity constraint ($b_i$) (block 1422). If the bandwidth usage value (bandwidth) is less than the bandwidth usage capacity constraint ($b_i$) (block 1422), the hub selection module 604 increments the bandwidth usage value (bandwidth) to the next incremental value based on the bandwidth usage granularity (K) (block 1424) and control returns to block 1412.

If at block 1422, the bandwidth usage value (bandwidth) is less than the bandwidth usage capacity constraint ($b_i$), the hub selection module 604 determines whether the bandwidth usage cost (cost) is less than the maximum cost value (MAX COST) (block 1426). If the bandwidth usage cost (cost) is less than the maximum cost value (MAX COST), the hub selection module 604 increments the bandwidth usage cost value (cost) to the next incremental value based on the bandwidth cost granularity (t) (block 1428) and control returns to block 1410.

If at block 1426 the bandwidth usage cost (cost) is not less than the maximum cost value (MAX COST), the hub selection module 604 determines whether the served quantity (served) of VPE routers is less than a total quantity (N) of VPEs in the multi-VPN network 400 of FIG. 4 (block 1430). If the served quantity (served) of VPE routers is less than the total quantity (N) of PEs, the hub selection module 604 increments the value of the served quantity (served) of VPE routers (i.e., served=served+1) (block 1432) and control returns to block 1408. Otherwise, if the served quantity (served) of VPE routers is not less than the total quantity (N) of VPEs, the example process of FIG. 14 is ended and control returns to a calling function or process such as the example process of FIGS. 11A and 11B.

Figure 15:
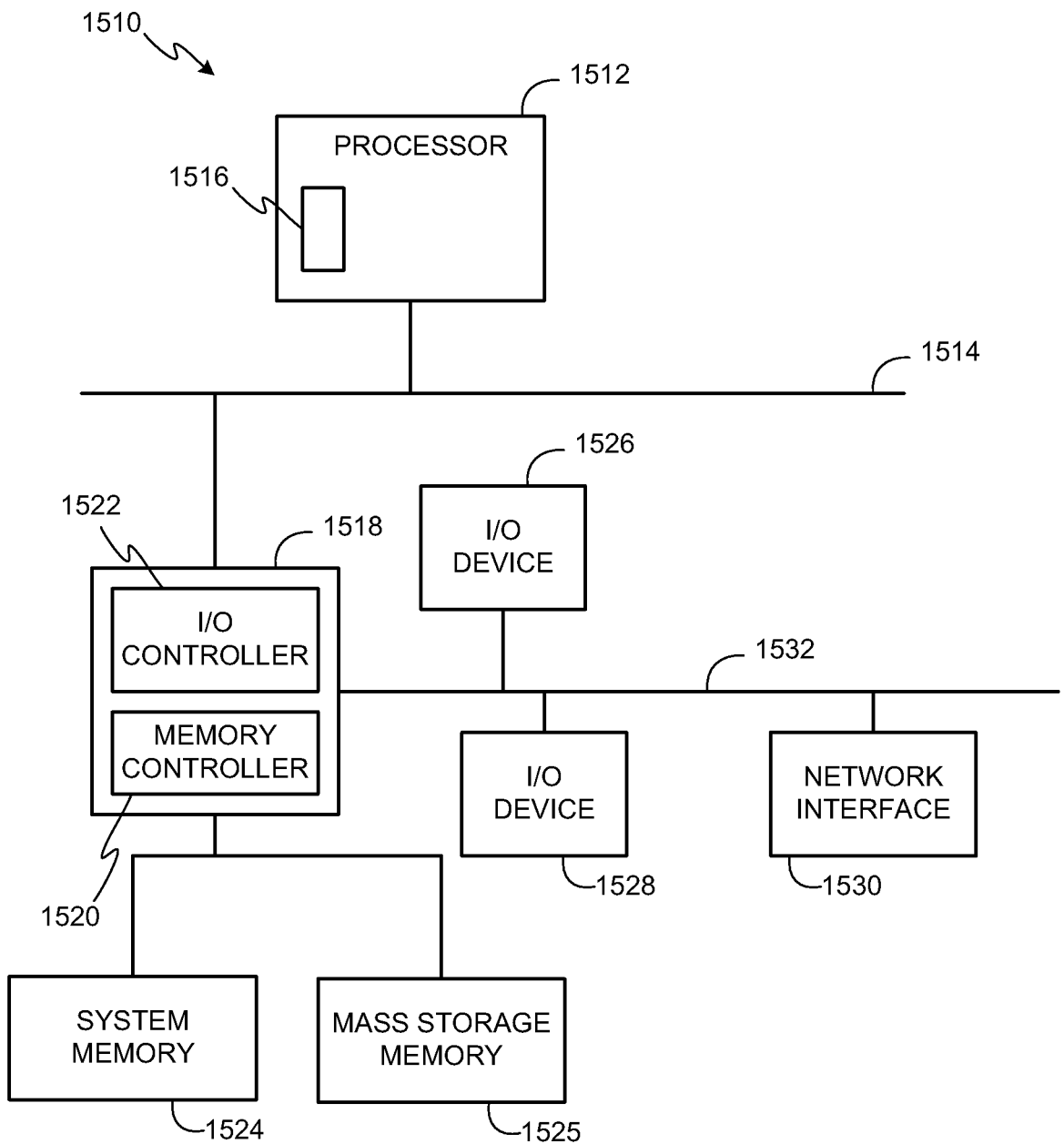
FIG. 15 is an example processor system that can be used to implement the example methods and apparatus disclosed herein.

FIG. 15 is a block diagram of an example processor system 1510 that may be used to implement the example apparatus, methods, and articles of manufacture described herein. For example, processor systems substantially similar or identical to the example processor system 1510 may be used to implement the multi-VPN hub selector 404 (FIGS. 4 and 6) and/or the multi-VPN traffic monitor 406 (FIG. 4). As shown in FIG. 15, the processor system 1510 includes a processor 1512 that is coupled to an interconnection bus 1514. The processor 1512 may be any suitable processor, processing unit, or microprocessor. Although not shown in FIG. 15, the system 1510 may be a multi-processor system and, thus, may include one or more additional processors that are identical or similar to the processor 1512 and that are communicatively coupled to the interconnection bus 1514.

The processor 1512 of FIG. 15 is coupled to a chipset 1518, which includes a memory controller 1520 and an input/output (I/O) controller 1522. A chipset provides I/O and memory management functions as well as a plurality of general purpose and/or special purpose registers, timers, etc. that are accessible or used by one or more processors coupled to the chipset 1518. The memory controller 1520 performs functions that enable the processor 1512 (or processors if there are multiple processors) to access a system memory 1524 and a mass storage memory 1525.

In general, the system memory 1524 may include any desired type of volatile and/or non-volatile memory such as, for example, static random access memory (SRAM), dynamic random access memory (DRAM), flash memory, read-only memory (ROM), etc. The mass storage memory 1525 may include any desired type of mass storage device including hard disk drives, optical drives, tape storage devices, etc.

In the illustrated examples described herein, the system memory 1524 may be implemented using a relatively fast memory such as an SRAM or TCAM to store the FIB 106a (or the FIBs 106b-e) of FIGS. 1 and 2. In addition, the mass storage memory 1525 may be implemented using a relatively slower memory such as a DRAM to store the RIB 108 of FIGS. 1 and 2.

The I/O controller 1522 performs functions that enable the processor 1512 to communicate with peripheral input/output (I/O) devices 1526 and 1528 and a network interface 1530 via an I/O bus 1532. The I/O devices 1526 and 1528 may be any desired type of I/O device such as, for example, a keyboard, a video display or monitor, a mouse, etc. The network interface 1530 may be, for example, an Ethernet device, an asynchronous transfer mode (ATM) device, an 802.11 device, a digital subscriber line (DSL) modem, a cable modem, a cellular modem, etc. that enables the processor system 1510 to communicate with another processor system.

While the memory controller 1520 and the I/O controller 1522 are depicted in FIG. 15 as separate functional blocks within the chipset 1518, the functions performed by these blocks may be integrated within a single semiconductor circuit or may be implemented using two or more separate integrated circuits.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above-described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are stored on a tangible medium, such as: a magnetic medium (e.g., a disk or tape); a magneto-optical or optical medium such as a disk; or a solid state medium such as a memory card or other package that houses one or more read-only (non-volatile) memories, random access memories, or other re-writeable (volatile) memories. Accordingly, the example software and/or firmware described herein can be stored on a tangible medium such as those described above or equivalents and successor media.

To the extent the above specification describes example components and functions with reference to particular devices, standards and/or protocols, it is understood that the teachings of the invention are not limited to such devices, standards and/or protocols. Such devices are periodically superseded by different, faster, and/or more efficient systems having the same general purpose. Accordingly, replacement devices, standards and/or protocols having the same general functions are equivalents which are intended to be included within the scope of the accompanying claims.

Further, although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A method comprising:
    for a first virtual private network installed on a candidate hub router, selecting a first spoke-to-hub assignment solution having a first least memory utilization cost to assign the candidate hub router a first quantity of first virtual private edge routers serving the first virtual private network;
    for a second virtual private network installed on the candidate hub router, selecting a second spoke-to-hub assignment solution having a second least memory utilization cost to assign the candidate hub router a second quantity of second virtual private edge routers serving the second virtual private network;
    determining third least memory utilization costs, each associated with assigning the candidate hub router to a respective third quantity of the first virtual private edge routers, and fourth least memory utilization costs, each associated with assigning the candidate hub router to a respective fourth quantity of the second virtual private edge routers; and
    selecting one of the first or second spoke-to-hub assignment solutions for the candidate hub router based on the first, second, third, and fourth least memory utilization costs.

2. A method as defined in claim 1, wherein the candidate hub router is a provider edge router communicatively coupled to a customer edge router associated with a customer of the first virtual private network.

3. A method as defined in claim 1, wherein the least memory utilization costs are based on at least a fixed cost of deploying and maintaining the candidate hub router.

4. A method as defined in claim 1, further comprising storing the first and second least memory utilization costs in per-virtual private network dynamic programming tables.

5. A method as defined in claim 4, further comprising storing the third and fourth least memory utilization costs in per-hub dynamic programming tables.

6. A method as defined in claim 5, wherein selecting the one of the first or second spoke-to-hub assignment solutions for the candidate hub router based on the first, second, third, and fourth least memory utilization costs is based on the per-virtual private network dynamic programming tables and the per-hub dynamic programming tables.

7. An apparatus comprising:
a memory storing machine readable instructions; and
a processor to execute the instructions to:
- for a first virtual private network installed on a candidate hub router, select a first spoke-to-hub assignment solution having a first least memory utilization cost to assign the candidate hub router a first quantity of first virtual private edge routers serving the first virtual private network;
- for a second virtual private network installed on the candidate hub router, select a second spoke-to-hub assignment solution having a second least memory utilization cost to assign the candidate hub router a second quantity of second virtual private edge routers serving the second virtual private network;
- determine third least memory utilization costs, each associated with assigning the candidate hub router to a respective third quantity of the first virtual private edge routers, and fourth least memory utilization costs, each associated with assigning the candidate hub router to a respective fourth quantity of the second virtual private edge routers; and
- select one of the first or second spoke-to-hub assignment solutions for the candidate hub router based on the first, second, third, and fourth least memory utilization costs.

8. An apparatus as defined in claim 7, wherein the candidate hub router is a provider edge router communicatively coupled to a customer edge router associated with a customer of the first virtual private network.

9. An apparatus as defined in claim 7, wherein the least memory utilization costs are based on at least a fixed cost of deploying and maintaining the candidate hub router.

10. An apparatus as defined in claim 7, wherein the processor is to execute the instructions to store the first and second least memory utilization costs in per-virtual private network dynamic programming tables.

11. An apparatus as defined in claim 10, wherein the processor is to execute the instructions to store the third and fourth least memory utilization costs in per-hub dynamic programming tables.

12. An apparatus as defined in claim 11, wherein selecting the one of the first or second spoke-to-hub assignment solutions for the candidate hub router based on the first, second, third, and fourth least memory utilization costs is based on the per-virtual private network dynamic programming tables and the per-hub dynamic programming tables.

13. A machine readable storage device comprising instructions which, when executed, cause a machine to perform a method comprising:
- for a first virtual private network installed on a candidate hub router, selecting a first spoke-to-hub assignment solution having a first least memory utilization cost to assign the candidate hub router a first quantity of first virtual private edge routers serving the first virtual private network;
- for a second virtual private network installed on the candidate hub router, selecting a second spoke-to-hub assignment solution having a second least memory utilization cost to assign the candidate hub router a second quantity of second virtual private edge routers serving the second virtual private network;
- determining third least memory utilization costs, each associated with assigning the candidate hub router to a respective third quantity of the first virtual private edge routers, and fourth least memory utilization costs, each associated with assigning the candidate hub router to a respective fourth quantity of the second virtual private edge routers; and
- selecting one of the first or second spoke-to-hub assignment solutions for the candidate hub router based on the first, second, third, and fourth least memory utilization costs.

14. A machine readable storage device as defined in claim 13, wherein the candidate hub router is a provider edge router communicatively coupled to a customer edge router associated with a customer of the first virtual private network.

15. A machine readable storage device as defined in claim 13, wherein the least memory utilization costs are based on at least a fixed cost of deploying and maintaining the candidate hub router.

16. A machine readable storage device as defined in claim 13, wherein the method further comprises storing the first and second least memory utilization costs in per-virtual private network dynamic programming tables.

17. A machine readable storage device as defined in claim 16, wherein the method further comprises storing the third and fourth least memory utilization costs in per-hub dynamic programming tables.

18. A machine readable storage device as defined in claim 17, wherein selecting the one of the first or second spoke-to-hub assignment solutions for the candidate hub router based on the first, second, third, and fourth least memory utilization costs is based on the per-virtual private network dynamic programming tables and the per-hub dynamic programming tables.

* * * * *